(12) United States Patent
Shatz

(10) Patent No.: US 9,600,538 B2
(45) Date of Patent: Mar. 21, 2017

(54) SYSTEMS AND METHODS FOR MANAGING LARGE VOLUMES OF DATA IN A DIGITAL EARTH ENVIRONMENT

(71) Applicant: the PYXIS innovation inc., Kingston (CA)

(72) Inventor: Idan Shatz, Calgary (CA)

(73) Assignee: the PYXIS innovation inc., Kingston (CA)

( * ) Notice: Subject to any disclaimer, the term of this patent is extended or adjusted under 35 U.S.C. 154(b) by 190 days.

(21) Appl. No.: 14/207,843

(22) Filed: Mar. 13, 2014

(65) Prior Publication Data
US 2014/0280158 A1   Sep. 18, 2014

Related U.S. Application Data

(60) Provisional application No. 61/791,264, filed on Mar. 15, 2013.

(51) Int. Cl.
*G06F 7/00* (2006.01)
*G06F 17/30* (2006.01)

(52) U.S. Cl.
CPC .............. *G06F 17/30536* (2013.01)

(58) Field of Classification Search
CPC ......... G06F 17/30463; G06F 17/30498; G06F 17/3064; G06F 17/30705; G06F 17/3071; G06F 17/30864; G06F 17/30935; G06F 17/30938; G06F 17/30941; G06F 17/30949; G06F 17/30982; G06F 12/084; G06F 12/0866; G06F 12/0884; G06F 12/0897; G06F 12/1036; G06F 17/30536; G06F 17/30542

(Continued)

(56) References Cited

U.S. PATENT DOCUMENTS 8,972,405 B1 *   3/2015   Chaulk ............. G06F 17/30194
                                                      707/737
2006/0224356 A1 *  10/2006  Castelli ............. G06K 9/00523
                                                      702/176

(Continued)

OTHER PUBLICATIONS

Goil et al., A Parallel Scalable Infracture for OLAP and Data Mining, Database Engineering and Applications, 1999. IDEAS '99. InternationalSymposium Proceedings, Year: 1999, pp. 178-186, DOI: 10.1109/IDEAS.1999.787266.*

(Continued)

*Primary Examiner* — Greta Robinson
(74) *Attorney, Agent, or Firm* — Bereskin & Parr LLP

(57) ABSTRACT

A computer-implemented method for managing large volumes of data comprises dividing data about a number of features into a plurality of data groups, each of the groups having a plurality of features, each of the features having a plurality of properties, and each of the properties having a property value; for each of the groups, determining a number of distribution ranges for the property values for each of the properties; for each of the groups, determining a number of features having property values that are within each of the distribution ranges; and generating a summary associated with each of the groups, the summary comprising the properties of the features in the group and the number of the features that are within each of the distribution ranges for the properties.

12 Claims, 30 Drawing Sheets

(58) Field of Classification Search
USPC ....... 707/600, 603, 713, 714, 715, 716, 737, 707/747, 767, 770, 771, 778, 809, 812, 707/769; 711/120, 122, 129, 130
See application file for complete search history.

(56) References Cited

U.S. PATENT DOCUMENTS

2009/0198736 A1* 8/2009 Shen ................ G06F 17/30339
2011/0302164 A1* 12/2011 Krishnamurthy . G06F 17/30979
707/737

OTHER PUBLICATIONS

Qi et al., Near-Uniform Range Parition Approach for Increased Partitioning in Large Database, Information Management and Engineering (ICIME), 2010 The 2nd IEEE International Conference on, Year: 2010, pp. 101-106, DOI: 10.1109/ICIME.2010.5477529.*
Lazardis, Progressive Approximate Aggregate Queries with a Multi-Resolution Tree Structure, SIGMOD 01 Proceedings of the 2001 ACM SIGMOD international conference on Management of Data, May 21-24, pp. 401-412, ACM, New York, NY, USA.
Garofalakis, M. N., and Gibbon, P. B. Approximate query processing: Taming the terabytes. In Proceedings of the 27th International Conference on Very Large Data Bases (VLDB) (2001).

* cited by examiner

SYSTEMS AND METHODS FOR MANAGING LARGE VOLUMES OF DATA IN A DIGITAL EARTH ENVIRONMENT

RELATED APPLICATIONS

This application claims the benefit of U.S. Provisional Patent Application Ser. No. 61/791,264 filed on Mar. 15, 2013, and entitled "SYSTEMS AND METHODS FOR MANAGING LARGE VOLUMES OF DATA IN A DIGITAL EARTH ENVIRONMENT", the entire contents of which are hereby incorporated by reference herein for all purposes.

TECHNICAL FIELD

The embodiments described herein relate to information management systems, and in particular to systems and methods for managing large volumes of data.

INTRODUCTION

In information technology, extremely large volumes data, referred to as "big data", consists of data sets that grow so large and complex that they become awkward to work with using existing database management tools. For example, the big data may include data about various buildings, infrastructure such as roads or wifi-networks, or demographics in a country. Depending on the size of the country, the data sets for these type of information could be extremely large.

The size of big data differs from cases to case. For example, the big data size may range from a few dozen terabytes to many petabytes of data in a single data set. In some cases, the big data size may be in petabytes, exabytes and zettabytes of data. Furthermore, the data sets may continuously grow in size as additional data may be constantly being gathered by information-sensors such as mobile devices, aerial sensory technologies (remote sensing), software logs, cameras, microphones, radio-frequency identification readers, wireless sensor networks, and so on. According to some approximations, 2.5 quintillion bytes of data are created each day.

Big data may include information that is valuable to different industries. However, big data may need to be processed to extract relevant information as intelligence. The intelligence extracted from big data may assist analysts in various industries, for example, to spot business trends, prevent outbreaks of diseases, or to reduce criminal activities. Industries that may wish to extract intelligence from big data, for example, include meteorology, genomics, connectomics, complex physics simulations, biological and environmental research, Internet search, finance and business informatics and so on.

While big data may contain valuable intelligence, it is generally challenging to process big data using existing data management tools due to the size of the data set. For example, processing volumes data in big data may require a significant amount of processing resources. As such, it may be difficult to capture, store, search, share, analyse, and/or visualize big data using existing database management tools.

Accordingly, there is a need for improved information systems for working with large volumes of data such as big data.

BRIEF DESCRIPTION OF THE DRAWINGS

Some embodiments will now be described, by way of example only, with reference to the following drawings, in which.

DESCRIPTION OF SOME EMBODIMENTS

Figure 1:
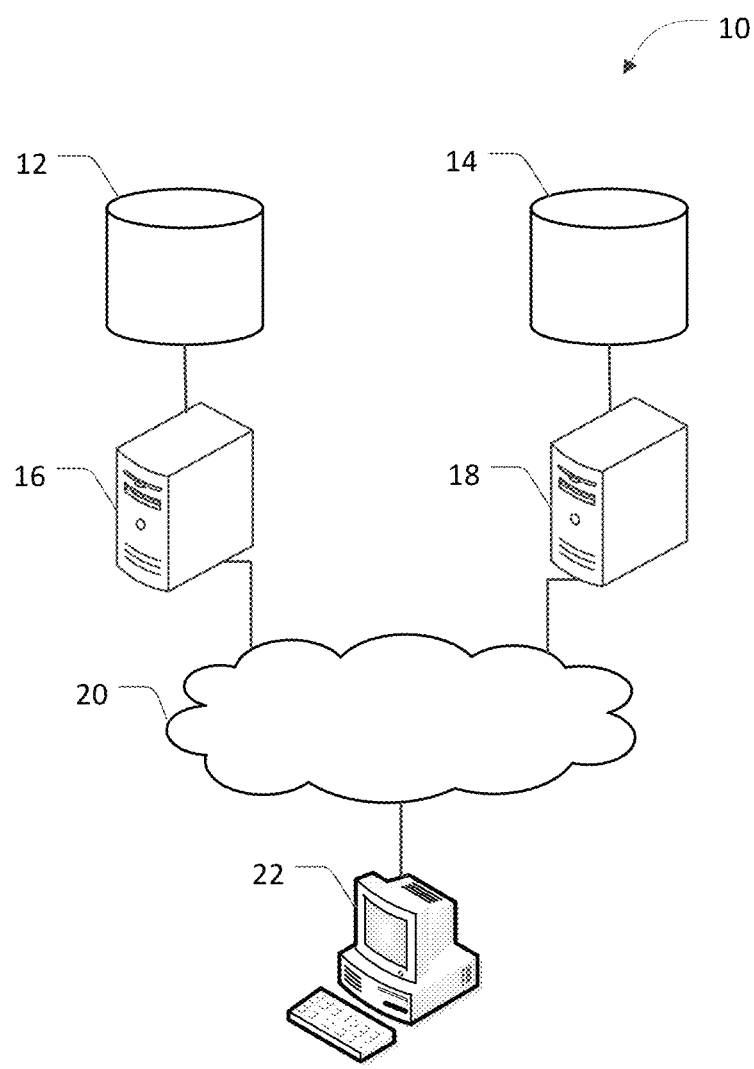
FIG. 1 is a schematic diagram illustrating a system for managing large volumes of data according to some embodiments.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described, but rather as merely describing the implementation of various embodiments.

In some cases, the embodiments of the systems and methods described herein may be implemented in hardware or software, or a combination of both. In some cases, embodiments may be implemented in one or more computer programs executing on one or more programmable computing devices comprising at least one processor, a data storage device (including in some cases volatile and non-volatile memory and/or data storage elements), at least one input device, and at least one output device.

In some embodiments, each program may be implemented in a high level procedural or object oriented programming and/or scripting language to communicate with a computer system. However, the programs can be implemented in assembly or machine language, if desired. In any case, the language may be a compiled or interpreted language.

In some embodiments, the systems and methods as described herein may also be implemented as a non-transitory computer-readable storage medium configured with a computer program, wherein the storage medium so configured causes a computer to operate in a specific and predefined manner to perform at least some of the functions as described herein.

As noted in the introduction above, big data includes large volumes of data. The size of big data may make it challenging to process big data to extract intelligence therefrom.

One way to process big data is to employ online analytical processing ("OLAP") techniques. OLAP techniques generally involves pre-processing the data set in big data to generate "n" dimension OLAP "cubes" where each dimension represents a property. Each cell in an N-dimensional cube may be an aggregate of all the features inside that cell. Once generated, processing queries using the cubes is generally efficient. However, it may be quite complex to generate the cube and it may require professional services of database administrators to set up each cube, merge cubes, and perform other administrative activities on the cubes.

Another way of working with big data is to process the data using the MapReduce framework. MapReduce algorithms are generally configured for parallel execution. An exemplary MapReduce framework includes a "map" phase executed by a master node where the input is divided into smaller sub-problems. The sub-problems are assigned to various worker nodes for parallel execution. The results of sub-problems are then assembled in a "reduce" phase to generate a response to the query. Using parallel execution allows complex queries to be addressed relatively speedily, provided the master node has access to a large number of processors available for parallel execution.

One limitation that is common to both of the above noted ways of working with big data is where the data sources are located remotely. Due to the volume of the data involved in big data, it is not practical to send big data remotely over a network to address one or more queries as network bandwidth may be limited.

Referring now to FIG. 1, illustrated therein is a system 10 for processing big data according to some embodiments. The system 10 in the embodiment as shown includes a data storage device 12 and a data storage device 14. The data storage device 12 is coupled to the server 16 and the data storage device 14 is coupled to the server 18. The servers 16 and 18 are in data communication with a network 20, which for example, may be the Internet. Electronic devices such as the computer 22 may connect to the network 20 to access the data storage devices 12 and 14.

Each of the data storage devices 12 and 14 may store big data. As noted above, big data may be a dataset that is related to a variety of topics in a variety of industries. However, for illustrative purposes, the exemplary big data stored in the data storage device 12 described herein will be said to relate to residential dwellings in a country and the exemplary big data stored in data storage device 14 will be said to relate to schools in the same country. In other embodiments, the big data stored in the databases may relate to different topics. There may also be a different number of databases and servers in other embodiments.

A number of summaries of successive levels are generated for each of the big data stored in the data storage devices 12 and 14. Each summary contains information about the data set that could be used to provide preliminary response to various queries. That is, queries directed to the big data could instead be conducted on the summaries instead of the big data in some instances. Each of the summaries may have a constant size that can be transmitted over the network 20. For example, each summary may be between one to ten megabytes in size. As the size of each summary is significantly less than the size of the big data, conducting queries on the summaries requires much less processing resources than conducting queries on the big data. Generation and contents of summaries are described in further detail herein below with reference to FIGS. 3 to 9.

Each of the servers 16 and 18 includes at least one processor that has access to the summaries relating to the big data stored in the data storage devices 12 and 14 respectively. In other embodiments, the summaries may be stored in one or more different servers.

The servers 12 and 14 are configured to provide appropriate summaries in response to one or more requests received from the electronic device 22. The electronic device 22 is configured to receive the appropriate summaries from the servers 12 and 14 and to conduct one or more queries on the summaries received. In other embodiments, one or more other processors may receive a query for the big data. The processors may then obtain relevant summaries from a data storage device storing one or more appropriate summaries.

The queries are processed on the received summaries to generate one or more preliminary result. As the queries are conducted on the summaries instead of the actual data, the preliminary result typically includes a margin of error associated therewith. However, in many cases, a preliminary result with a margin of error may be sufficient. As such, this may provide an advantageous trade-off in terms of providing sufficiently accurate results without requiring a large amount of processing resources. Furthermore, if results without margins of errors are desired, it is possible to process the queries on successively lower-level of summaries until the query is conducted on the data set itself. This process is described in further detail herein below with reference to FIGS. 10-13. In contrast, conducting the search on the big data directly would provide accurate results but at a cost of requiring a large amount of processing resources.

Figure 2:
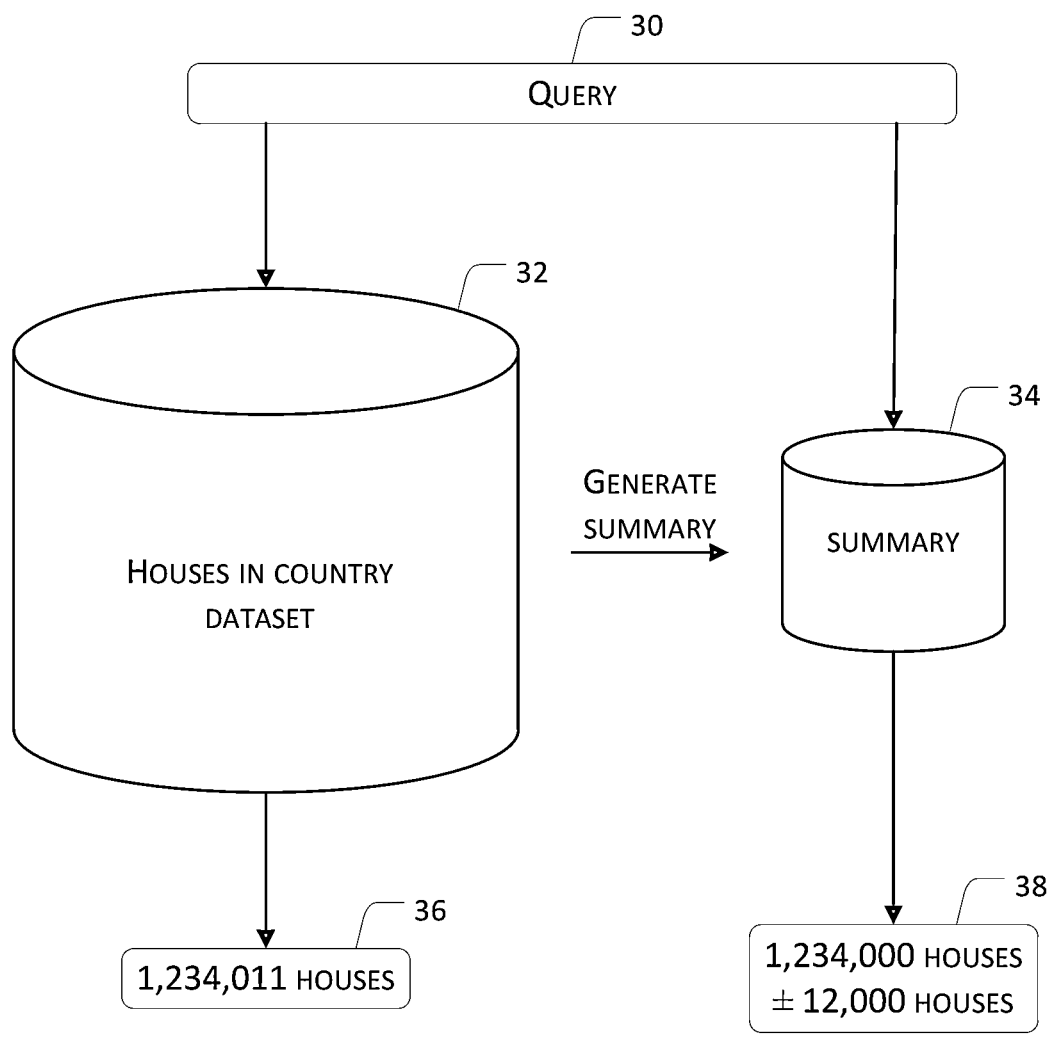
FIG. 2 is a schematic diagram illustrating exemplary execution of a first exemplary query by the system of claim 1.

Referring now to FIG. 2, illustrated therein is an exemplary query 30 that is processed on a big data, represented by data set 32 stored in the data storage device 14 and a summary 34 of the big data 32. As noted above, the big data 32 relates to residential dwellings in Canada. The big data, in this example, is approximately 500,000 megabytes in size. The summary 34, in contrast, is approximately one megabyte. The query 30 relates to determining the numbers of residential dwellings that are larger than 2000 square feet, that is occupied by two or more individuals, and that is not located in geographical area X.

Processing the query 30 on the big data 32 provides a result 36. Processing the query 30 on the summary 34 provides a preliminary result 38. The result 36 provides an exact number of residential dwellings that meets the criteria provided by the query 30. In contrast, the preliminary result 38 provides an approximation of the number of residential dwellings that meet the criteria. The preliminary result 38 also includes a margin of error of plus or minus 12,000 buildings, which is about 1% of the preliminary result. In many cases, the preliminary result with a margin of error may be sufficient such that processing resources need not be spent on conducting the query 30 on the big data 32 to obtain the exact response.

Figure 3:
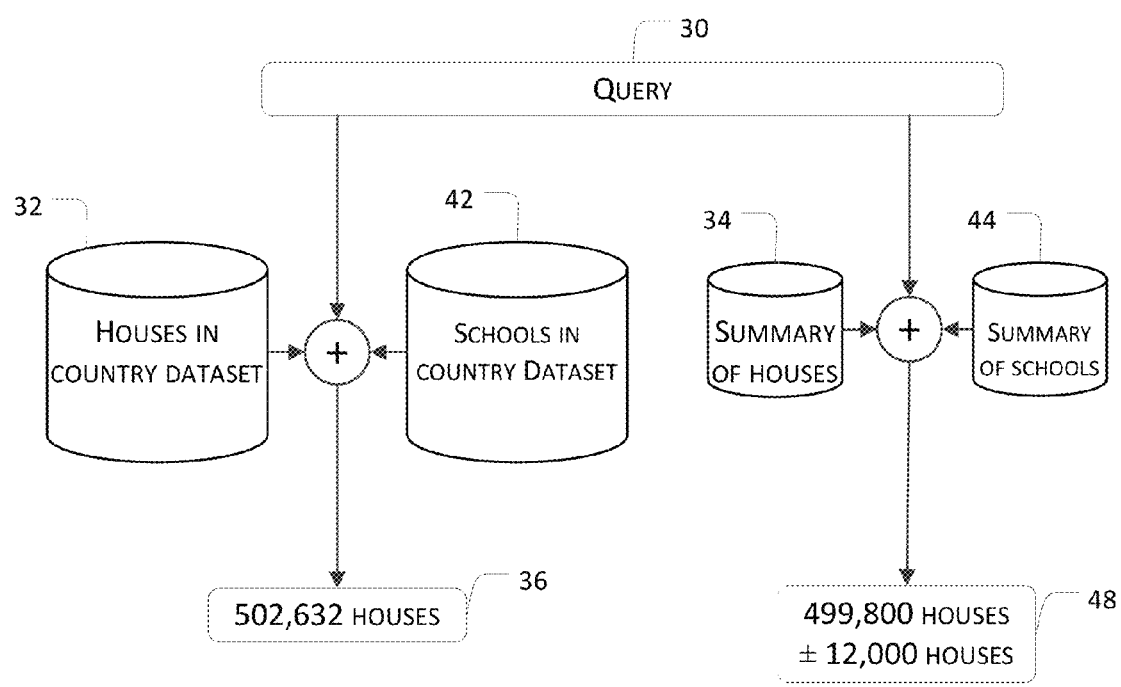
FIG. 3 is a schematic diagram illustrating exemplary execution of a second exemplary query by the system of claim 1.

Referring now to FIG. 3, illustrated therein is a second exemplary query 40. In this example, the query 40 requires the big data 32 stored in the data storage device 12 and the big data stored in the data storage device 14, which is represented by data set 42. The big data 42 has a summary 44 associated therewith. As noted above, the big data set 42 relates to schools in the country X. The size of the big data 42 is approximately one gigabyte while the size of the associated summary, in contrast, is significantly smaller at about one megabyte.

The query 40 relates to determining the numbers of residential dwellings that are larger than 2000 square feet, occupied by two or more individuals, not located in geographical area X, and have a school A and school B nearby.

The query 40 needs to be processed on both of the big data 32 and the big data 42 as the query 40 relates to the information stored in both sets of data. In some cases the query may be executed on the big data 32 and the big data 42. The results from each execution is joined to obtain the result 46, which provides the exact number of residential dwellings that meet the criteria set out in the query 40.

The query 40 can also be processed on the summaries 34 and 44 of the big data 32 and 42 respectively. The results from executing the query 40 using the summaries 34 and 44 can be joined to obtain the preliminary result 48 and a margin of error associated with the preliminary result 48 is computed. In the case, the margin of error is approximately 2.4% which is plus or minus 12,000 buildings. As noted above, this preliminary result 48 may be sufficient for the purposes of the query 40 and it may not be sufficient to execute the query 40 on the big data 32 and 42.

Another advantage of executing the queries 30 and 40 on the summaries is that the queries can be executed by the electronic device 22. That is, as the sizes of the summaries are relatively small, it is possible to transmit the summaries to the electronic device 22 where the query may be executed. In embodiments where there are tens of thousands of electronic devices providing the queries, this type of configuration may be useful as the servers will be able to offload the processing of the summaries to the devices with the queries. For example, in a digital earth system, tens of thousands of electronic devices may connect to the servers to execute various queries. In such cases, it may require less processing resources on the server to determine appropriate summaries and transmit the summaries to the electronic devices for execution.

Figure 4:
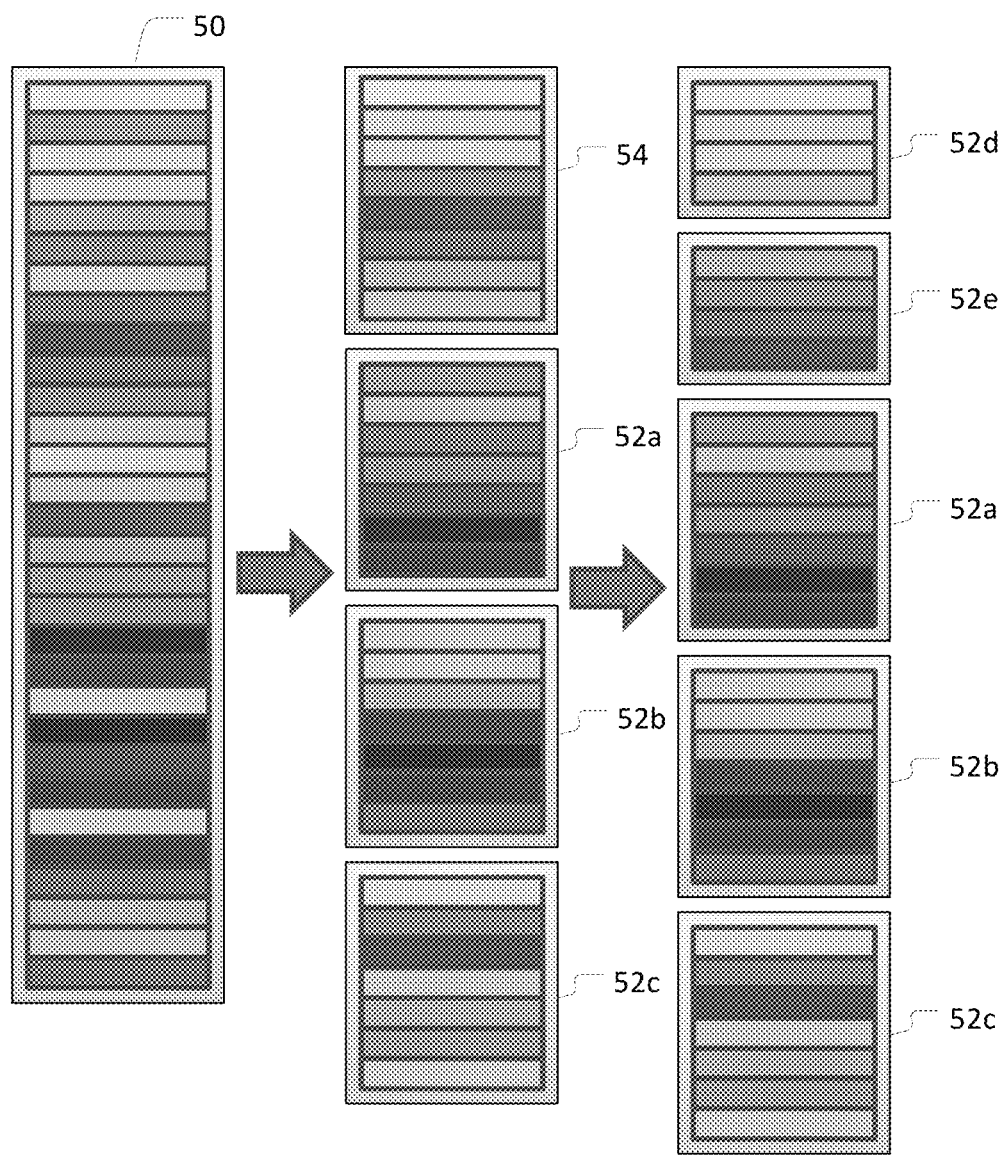
FIG. 4 is a schematic diagram illustrating how features with similar properties may be grouped together in the system shown in FIG. 1 to generate summaries for each group of features.
Figure 5:
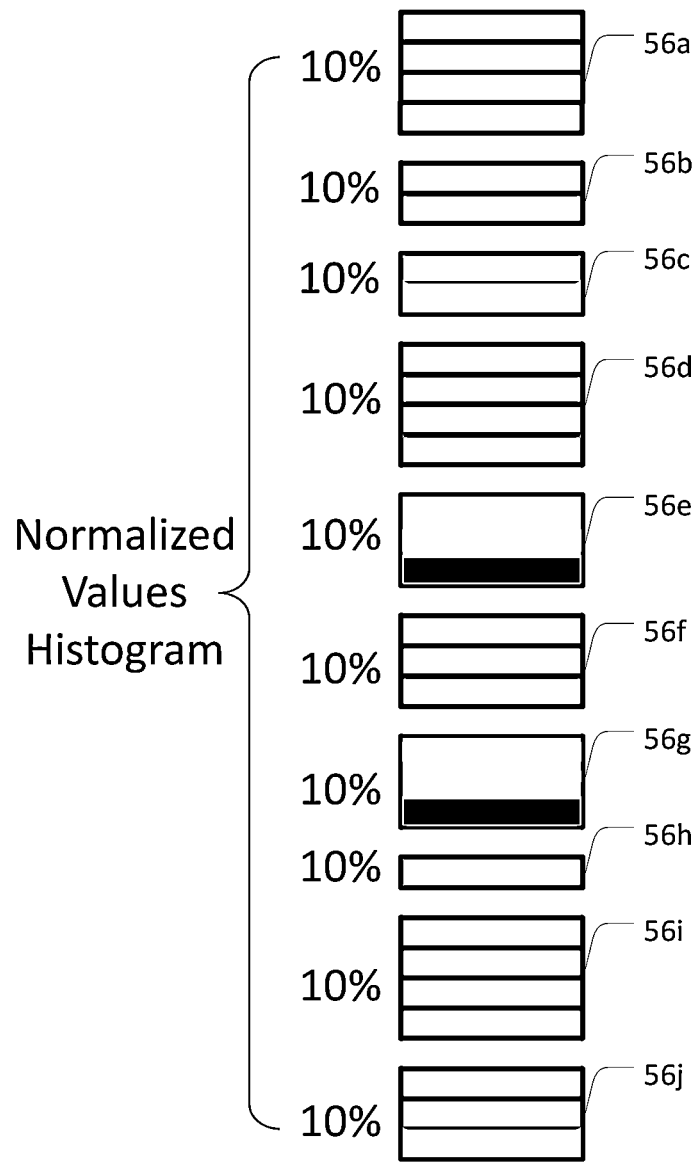
FIG. 5 is a schematic diagram illustrating how values in each group are normalized in the system shown in FIG. 1.

Referring now to FIGS. 4 and 5 illustrated therein is schematic diagram illustrating, by example, how summaries may be generated from given big data 50 according to some embodiments.

The big data 50 is divided to form smaller data groups 52a, 52b, 52c and 54. The groups 52a, 52b and 54c are generally of the same size in that they include the same number of features in each group. Each feature, for example, could be a data element in the big data such as a unique "key" entry. A feature, for example, may be a dwelling such as a house, an apartment unit, a condo suite or a townhouse if the big data 50 is related to residential dwellings. In another example, the features could be various schools if the big data 50 is related to schools in a country. In another example, the features could be various roads, buildings, parks, lamp posts, and so on.

In cases, where the first sub-division of the big data 50 yields groups that are larger than desired size, these groups may be further sub-divided as necessary to obtain additional data groups that are of each of smaller size. In the example as shown, the data group 54 is sub divided to obtain data group 52d and 52e. The data groups 52a-52e are generally about the same size. In some cases, the groups may be divided as shown in FIG. 5 such that each group 56a-56k includes about 10% of the overall number of entries. The overall number of data groups 52 may depend on the size of the big data 50. The example shown in FIG. 5 illustrates 10 data groups. In some cases, there may be 100 to 1000 data groups.

The number and the size of the groups may be optimized based upon various factors such as client specification, network bandwidth and the type of dataset. For example, a dataset with few properties could be group into 100K features as it will be faster to go over 100K numbers instead of 1 single histogram. However, a complex dataset with large number of properties could be divided into smaller group of 1000 features as it will take more effort to scan the group.

Each group could be selected to have similar features found in the data set. For example, if the big data 50 is related to residential dwellings, the data groups for the residential dwellings could formed based upon location, number of residents, type of residents, and so on.

Groups can be created using a number of suitable algorithms, either with human input or without (i.e. automatically). Moreover, as will be described later, the algorithm could change over time automatically depending the nature of the queries been executed on the dataset. For example, and algorithm for grouping could be simple as divide the features into group of 100 in the order they were stored. However, this algorithm would produce very high error bounds (as the features are not selected for a purpose), which may lead to poor performance. A more efficient way to create the groups may involve utilizing location information as described herein below.

In another example, if most of the queries are performed on a single attribute, like price, an algorithm that split into groups by price can implemented. The algorithm may be executed in phases. In the first phase, the algorithm may calculate the global histogram of houses and in the second phase, the algorithm may split the houses into groups based upon the distribution determined in the first phase.

By generating the data groups by selecting similar features, the groups may be generated automatically based upon the big data. That is, it may not be necessary for a data base administrator or other skilled professional to design customize the groups similar to creating a customized OLAP cube.

In contrast, the groupings formed as described above may allow client computers in a distributed system such as system 300 described hereinbelow (with reference to FIG. 15) to generate different summaries on-demand when required by a query. Moreover, due to the nature of the distributed network, clients across the network can generate the summaries in parallel and therefore reduce the overall time require to generate the overall summary. It will also distribute the load away from a centralized server to different nodes.

In some cases, one or more properties of the feature may include spatial information. For example, if the feature is related to a house, the spatial information may include the longitude and longitude coordinates, the city, the state, the country, and/or other spatial information related to the location of the house. In some cases, the spatial information may include identifiers values (indexes) associated with associated with a Digital Earth system such as a PYXIS index value described in U.S. Pat. No. 8,018,458 to Perry Peterson.

One approach to include spatial information is to include the spatial information when the big data is being divided into groups. For example, houses may be grouped by houses that are located in each city, each neighbourhood, or other geographical location. The geographical location area that is used to divide up the dwellings may differ in size depending on the number of feature that will be placed within the group. For example, as the number of residential dwelling density tends to be higher in the cities, the area of geographical location for each group in the city would be less than the area of geographical location for each group that is in the country side. By dividing up the features into groups based upon their location, features that are closed to each other are grouped together.

Another approach to include spatial information does not use the spatial information to divide the features into data groups as noted above. However, due to the principle that similar features are grouped together in some cases, the features that are geographically closed to each other may be located within the same group.

Moreover, the algorithm of dividing the features into groups could change depend on the size of the group. For example, the dataset could be divided at the first levels by location, until groups having 10K features are obtained. At this point, the group of 10K features associated with a locality can be divided into 10 sub-groups using a clustering algorithm based upon selected features. This may provide a better performance when performing queries that have both spatial and properties as constraints.

Figure 6:
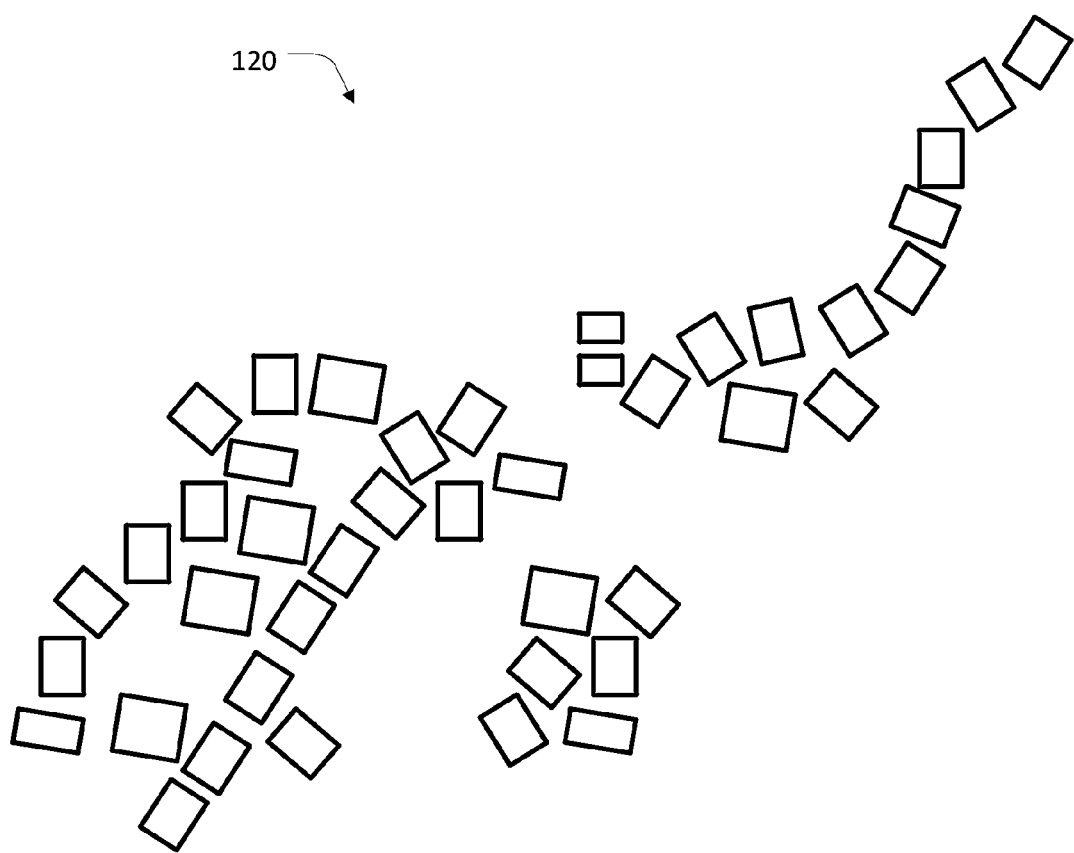
FIG. 6 is a schematic diagram illustrating features that are not grouped.
Figure 7:
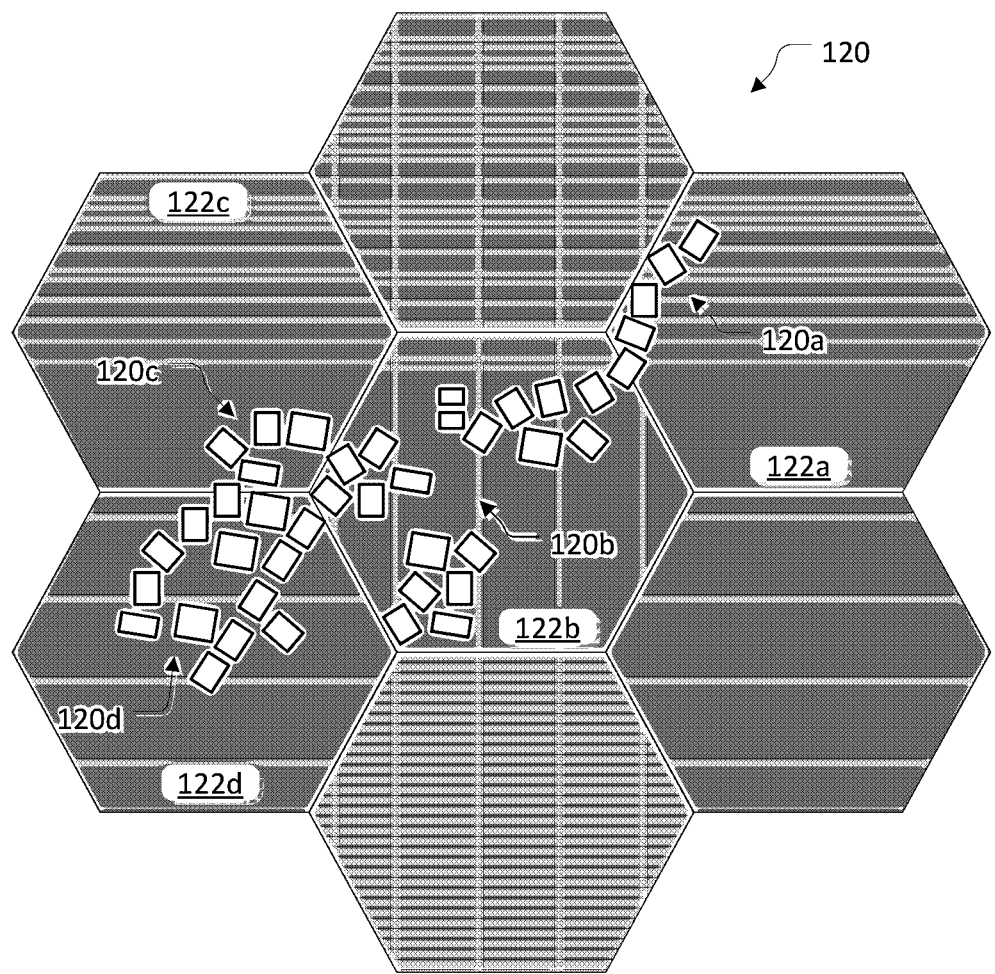
FIG. 7 is a schematic diagram illustrating features that are grouped to generate summaries by system shown in FIG. 1.

Referring now to FIG. 6, illustrated therein is an exemplary grouping of features based upon their location. FIG. 6 shows the location of the features 120 (e.g. houses) from a plan view that has not been grouped. These features 120 have not been grouped. In FIG. 7, the features have been grouped based upon the cells that are associated with each feature. The PYXIS cell indexing is described in detail in U.S. Pat. No. 8,018,458 to Perry Peterson. For example, groups 120*a*, 120*b*, 120*c*, and 120*d* of features are associated with cells 122*a*, 122*b*, 122*c* and 122*d* respectively.

In some cases, some of the features may be located at the intersection of two or more cells. In such cases, a parent cell for the feature may be determined. To determine the parent cell for the feature, a bounding area (e.g. a circle) for the feature may be calculated. Then, a mapping between the bounding area to a single cell could be determined. An exemplary mapping method that may be used include determining a cell resolution wherein the radius of bounding area on a cell is larger than the features bounding area. At that resolution, the cell that contains the centre of the features bounding area could be located. This method provides two useful properties. Firstly, it provides a quick and unique mapping from a feature location to a Pyxis Index. This can be used as hash value in order to shuffle the work load when generating summaries in a distributed system 300 described herein below with reference to FIG. 16. For example, if there are 100 nodes that are generating the summary of a given dataset, then work can be distributed based upon a hash function of the index. In one instance, node X may be assigned features that are associated with location index as determined by hash(index) % 100. This mapping generates spatial compact groups with features that have more or less the same size. This may be very useful for rendering and for performs joins between two or more spatial datasets.

Using spatial indexing such as Pyxis Indexing to generate groups, as opposed to r-tree or sphere-tree, allows efficient spatial joining of the groups. As the Pyxis indexing is built on top a multi-resolution global tessellation, it is possible to import datasets such as satellite imagery (low resolution imagery), Lidar data (high resolution imagery), city land usage data (mid resolution vector data) and so on. Furthermore, as the groups are organized using the same Pyxis indexing, it is possible to locate intersecting groups at different resolutions as well as from different datasets.

In contrast, many current indexing methods are based upon r-tree, which may be susceptible to problems of integrating different projections. For example, the satellite imagery used WGS84 projection while Lidar data used NAD83 UTM10. In order to solve this issue the system may need to project one of the dataset into the other, which may introduce errors and require additional computing resources.

Furthermore, generating the groups based upon the Pyxis indexing may reduce or eliminate the need to re-project the dataset.

Figure 8:
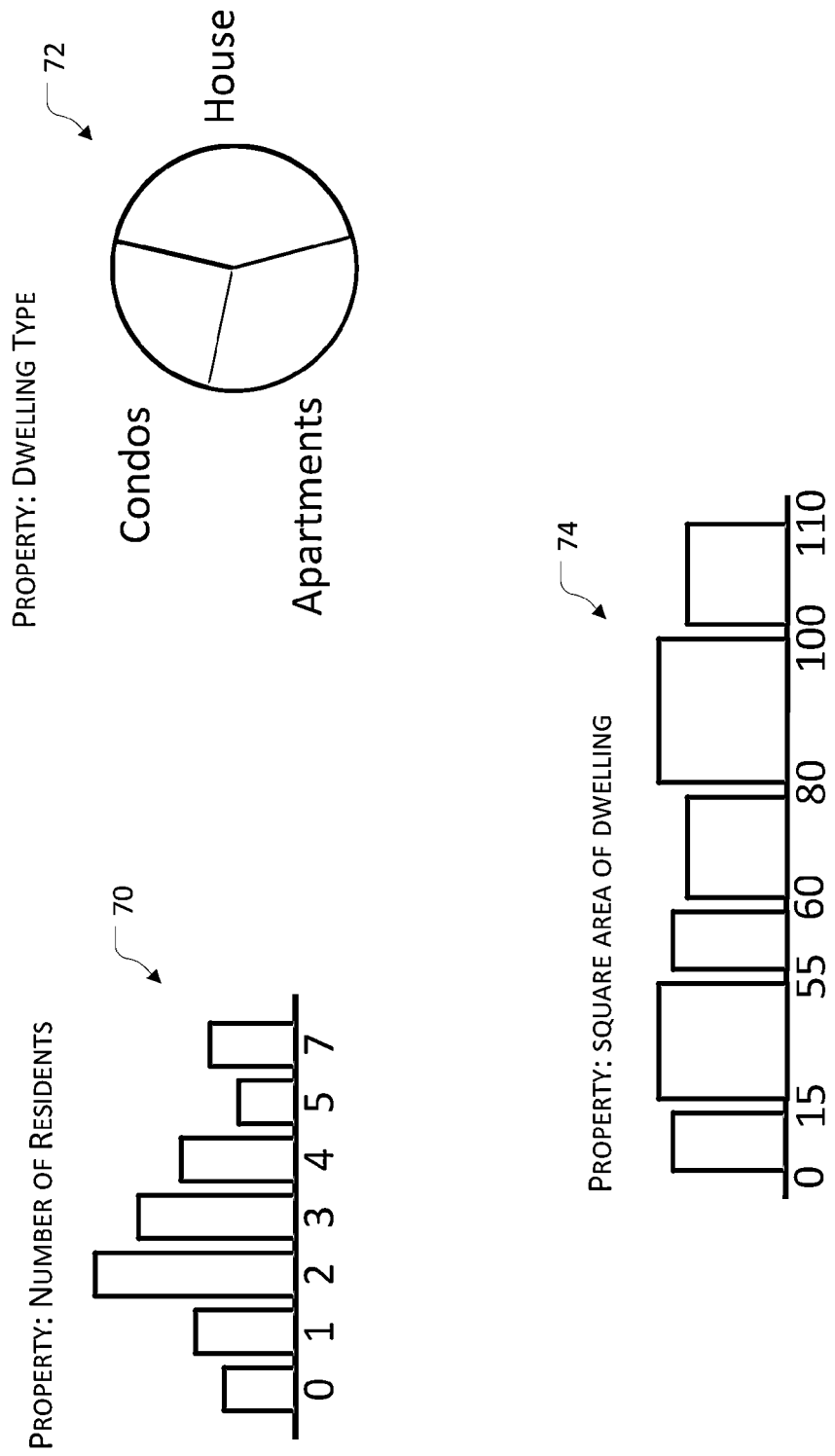
FIG. 8 is a schematic diagram illustrating various diagrams that may be generated based upon the properties of features and the distribution of the values of the properties stored in the summaries of the system shown in FIG. 1.

Referring now to FIG. 8, illustrated therein are a number of exemplary diagrams 70, 72, 74 that may be generated from the distribution of values included in each summary for each data group.

The histogram 70 shows the distribution of the number of residents per feature in that group. From the diagram 70, it can be observed that residential dwellings with two residents are the most common for the data in that group. This histogram may change from group to group. For example, if the data group includes residential dwellings that are located in an area where families are more common, the residential dwellings with 3 or more individuals may be most common.

The diagram 72 shows the distribution of the building types in the group as a pie-chart. From the diagram 70, it can be observed that houses are the most common type of dwellings for the data in that group, followed by apartments and condominiums. This diagram may change from group to group. For example, if the group includes features from a downtown area of a metropolis, then the condos and apartments may be the most common features.

The diagram 74 shows the distribution of the area of the dwellings in the group. In these cases, a range of values are determined. As shown, the ranges are 0-15 area units, 15-55 area units, 60-80 area units, 80-100 area units and 100-110 area units. The area units may be square meters. The ranges are determined such that a normalized distribution of values occurs within the ranges. In some cases, there may be 500 to 1000 ranges.

After the features are divided to form data groups, a summary for each group is generated. The summary includes the properties (e.g. statistical information) that are present in the elements of each group and a distribution of values for the properties. In some embodiments, a number of ranges for the values of each property may be determined. The number of features that has the property and that is within each of the ranges may be counted. This "count" value for each range for each property may be included in the summary. The summary may also include other statistical values such as a minimum value, a maximum value, an average value for each of the features or any other suitable statistical information that may provide be used to respond to queries.

In some cases, it may be desirable to merge summary data including two or more histograms. In such cases, it is useful to have the ranges of the histogram aligned. To encourage alignment of the histogram ranges, the ranges may be determined based upon binary values (i.e. power of 2). For example, ranges would be from −1024 . . . 1024. That would be divided into two ranges −1024 . . . 0 and 0 . . . 1024, and would be divided into −1024 . . . −512, −512 . . . 0, 0 . . . 512, 512 . . . 1024, and so on until a range that would include less than 1% of the number of features is obtained. If the ranges are aligned, it is possible to aggregate two histograms together. A description of how ranges and sub-ranges is described herein below.

As noted above, the summaries include various statistical information about the features in the data group but not the features themselves. This allows the summaries to be relatively small in size (e.g. 1-10 Mb) when compared to the bit data 50. The data size for each summary may be calculated as follows.

The data size for property would be the number of ranges (e.g. 1000) multiplied by the information stored for each range. It should be understood that the range in some cases may be a single value rather than a range between two values. For each range there may be a maximum value, a minimum value and a count value indicative of the total number of features that falls in that range. As such, the data size may be 1000 ranges multiplied by 3 values (for min, max, and count). This method can be converted to store histogram on string data (words).

As there may be a plurality of properties for the features in the group, the overall data size for the summary of the group may be multiplied by the number of properties. For example, if there are 50 properties, then the data size for the summary would be number of properties multiplied by the number of ranges per property multiplied by the number of values stored for each range.

Based upon asymptotic notation (i.e. "the big O notation"), the size of the summaries could be said to be linear to the number of properties as the ranges and the values stored each range is constant in that they do not increase with the size of the data. That is, the size of the summaries is $O(p)$ where p is the number of properties. In contrast, the size of an OLAP cube is exponential (i.e. $O(e^p)$). As such, the summaries are a relatively efficient way to store information about the big data. Moreover, as the statistical summaries for all of the properties may not be packaged together, it is possible for the clients to download only summaries that are needed to perform the query.

Figure 9:
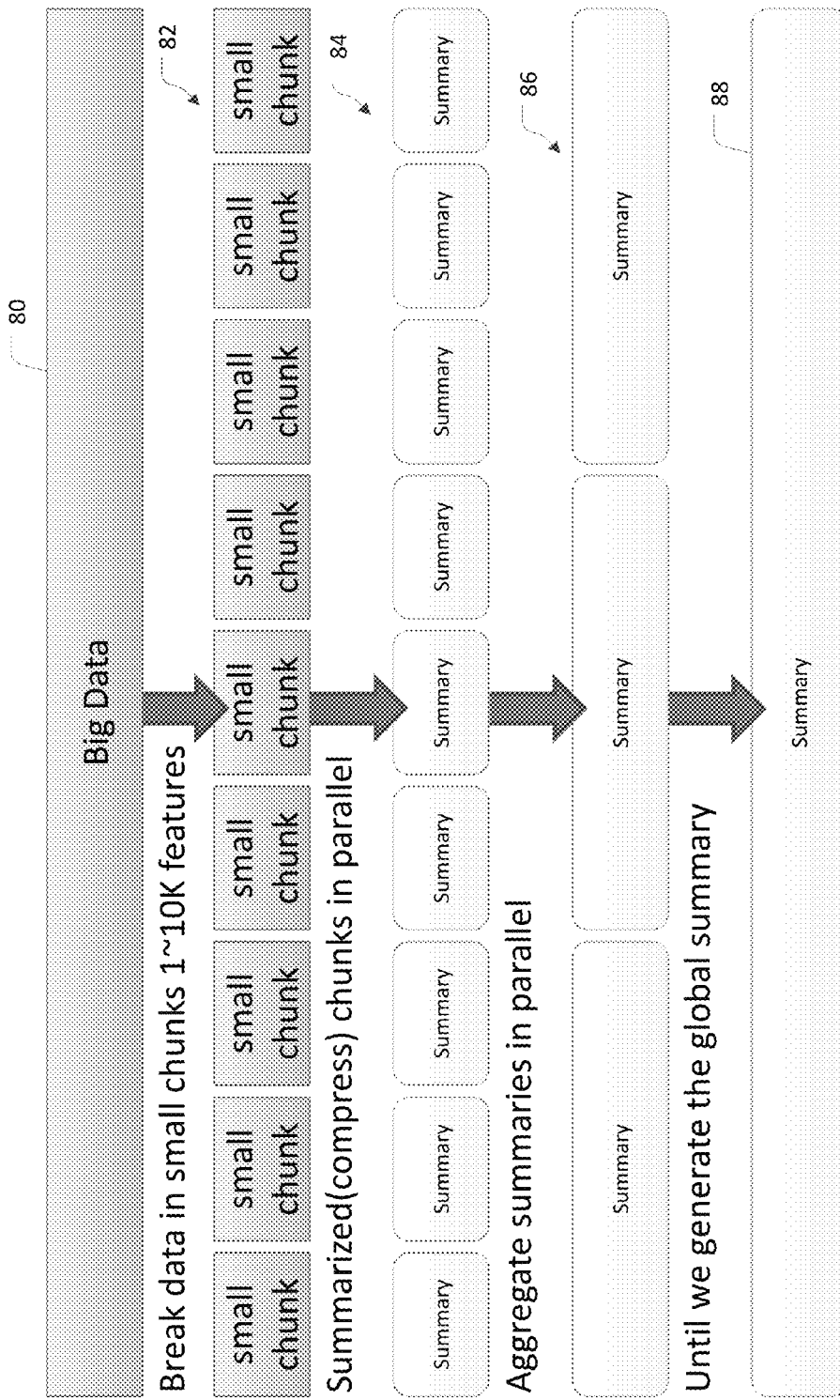
FIG. 9 is a schematic diagram illustrating various levels of summaries that may be provided by the system shown in FIG. 1.

Referring now to FIG. 9, illustrated therein is a schematic diagram illustrating how a plurality of summaries may be aggregated to generate higher level summaries according to some embodiments. As shown the big data 80 is divided into smaller data groups 82. This may be similar to the division of the big data 50 to data groups 52 described herein above with reference to FIGS. 4 and 5. A summary 84 for each group is generated. The summaries 84 may be similar to the summaries 62 that are generated for the groups 52 described herein above with reference to FIG. 8.

The summaries 84 are aggregated to form higher-level summaries 86 that includes information about more than one group 82 of features.

In some cases, aggregating the summaries 82 may involve merging the properties for various features. For example, if a summary includes information about properties P1, P2, and P3, and a second summary includes information about properties P2, P4, and P5, the aggregated summary will include information for properties P1, P2, P3, P4 and P5.

In some cases, aggregating the summaries 82 may involve merging the ranges for one or more of the properties. For example, if the property P2 has ranges R1, R2 and R3 in one summary and the same property has ranges R1, R2 and R4 in another summary, merging the two summaries will provide range R1, R2, R3 and R4 in the aggregated summary.

In some cases, aggregating the summary may involve merging the distribution values for each range for similar properties. For example, if the Range R2 for property P2 of one summary has a count value X, and the same range for the same property for another summary has a count value Y, merging the two summaries will provide a count value X+Y for that range for that property. Other values for the range may also be merged.

Figure 9A:
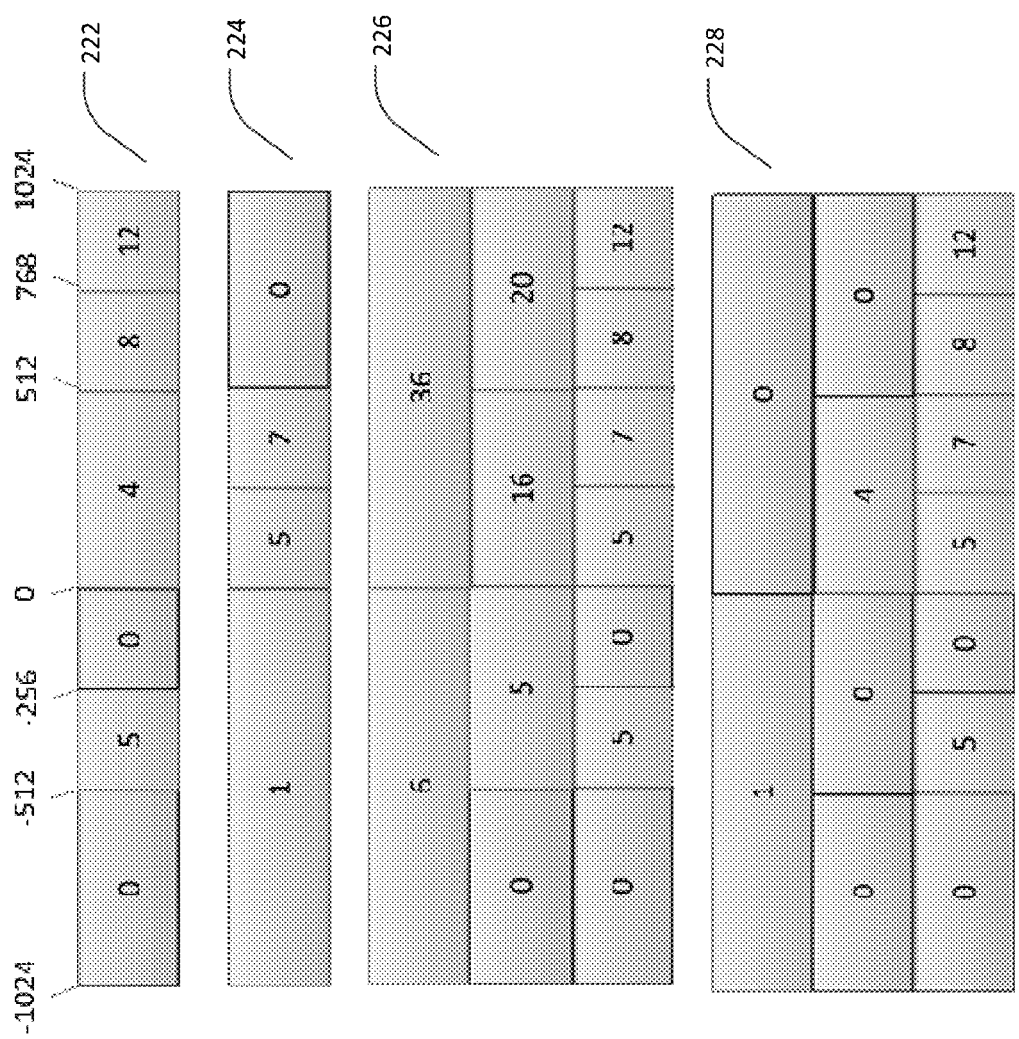
FIG. 9A is a schematic diagram illustration how various histograms that may be provided by the system shown in Figure can be combined.

Referring now to FIG. 9A, illustrated therein is how two exemplary histograms, namely histogram A indicated by reference numeral 222 and histogram B indicated by reference numeral 224 may be merged. In the example, histogram A has a number of ranges that over laps with a number ranges in histogram B. Histogram C, indicated by reference numeral 226 illustrates the merged histogram A and B. Histogram D, indicated by reference numeral 228 illustrates the margin of error. For example, histogram A indicates that there are 5 counts in the range −256 to −512 and histogram B that there is one count in the range −1024 to 0. Merging these two together, it could be estimated that there are 6 counts within the range −1024 to 0 with the error margin of "1".

Generalizing the above described concept, it is possible to combine histogram with a range R5 (with count X) with another histogram that has ranges R6 and R7 (with count Y and Z respectively) where R6 and R7 are within range R5. To combine the histograms, they could be stored as tree and not as list of bins. In such a case, it is possible combines the histograms to understand that range R5 will have counts X+Y+Z. Range R5 has two children ranges, namely ranges R6 with count Y and R7 with count Z. Furthermore, combining the histograms this way introduces a level of uncertainty to the combined histogram. For example, if the query requests the number of counts within R6, the result would be min value of Y and max value of X+Y. However, it is uncertain how many features in R5 from histogram one are contained in histogram R6. A more compressible way to store the information is to store the count difference between a range count and the sum of count of its children ranges for example as shown in histogram 228. This is more compressible because, storing the difference produces more zero counts and therefore amenable to compression. Another possible advantage of this is that it is easy to perform the adding operation as it simply an add operation for each range.

In the example shown in FIG. 9, the summaries 84 are aggregated to form summaries 86 and the summaries 86 are aggregated again to form a summary 88. The summary 88, which may be referred to as the "root summary" or the "global summary" and includes the information about all of the features in the big data.

In other embodiments, there may be more than three levels of summaries. For example, if there are 100 groups, there may be seven levels of summaries.

Each higher level summary may also include identification information of the lower-level summaries that it has aggregated. As such, it is possible to retrieve lower-level summaries if data at a different level is desired, for example based upon Pyxis index Referring now to FIGS. 10 to 14, illustrated therein are various stages in an exemplary execution of an exemplary query 90.

Figure 10:
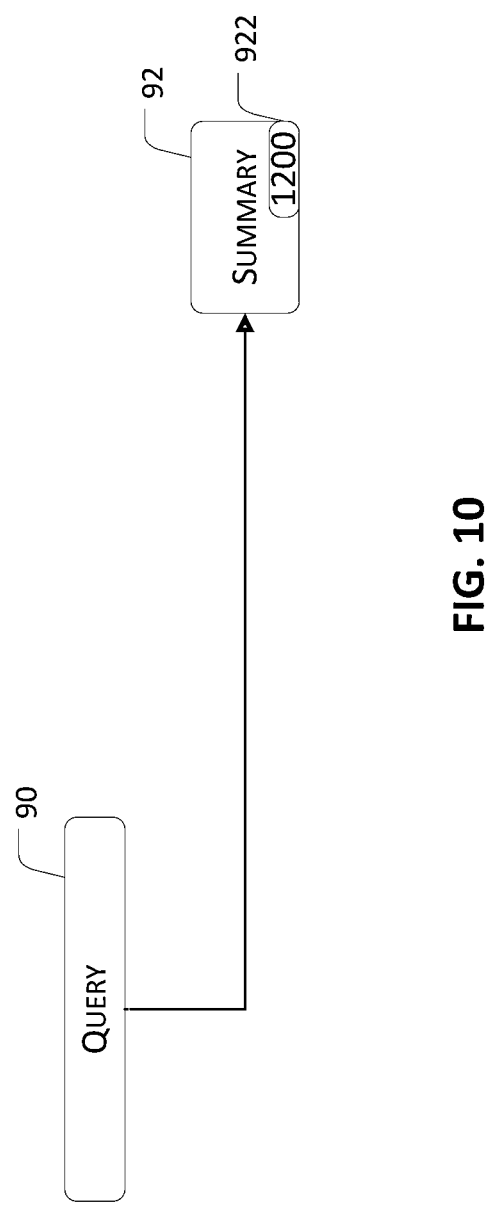
FIG. 10 is a schematic diagram illustrating how a query may be processed at a first summary according to some embodiments.

In FIG. 10, the query 90 is first executed in a summary 92. The summary 92, for example may be a root summary. Executing the query 90 at the summary 92 returns a preliminary result 922 stating that there are 1200 features that match the criteria provided in query 90. A margin of error for the preliminary result may also be calculated.

In some embodiments, the margin of error may be calculated as follows. For example, assume that an exemplary query wants to know the number of dwellings that are less than 500 square feet that paid $800 in taxes. For the property relating to the size of the dwelling, one of the ranges may be 450-550 square feet and the count (i.e. number of features that are within that range) could be 10,000 homes. Similarly, for property relating to the amount of taxes paid, one of the ranges for the property may be $500-1000 in taxes and the count could be 2,000 homes. In such cases, the margin of error may be calculated in a number of ways. For example, if an exemplary query may request dwellings that was 500 square feet and 800 in taxes, the error bound would be 0 to min(max(500 square feet), max(800 in taxes). This estimation may include error bound as high as 50% (which is relatively large). However, if the query is conducted at one level lower within the histogram, the error bound may be reduced dramatically. In another example, a 2D histogram created on both square feet property and taxes may be used to respond to such queries.

Figure 11:
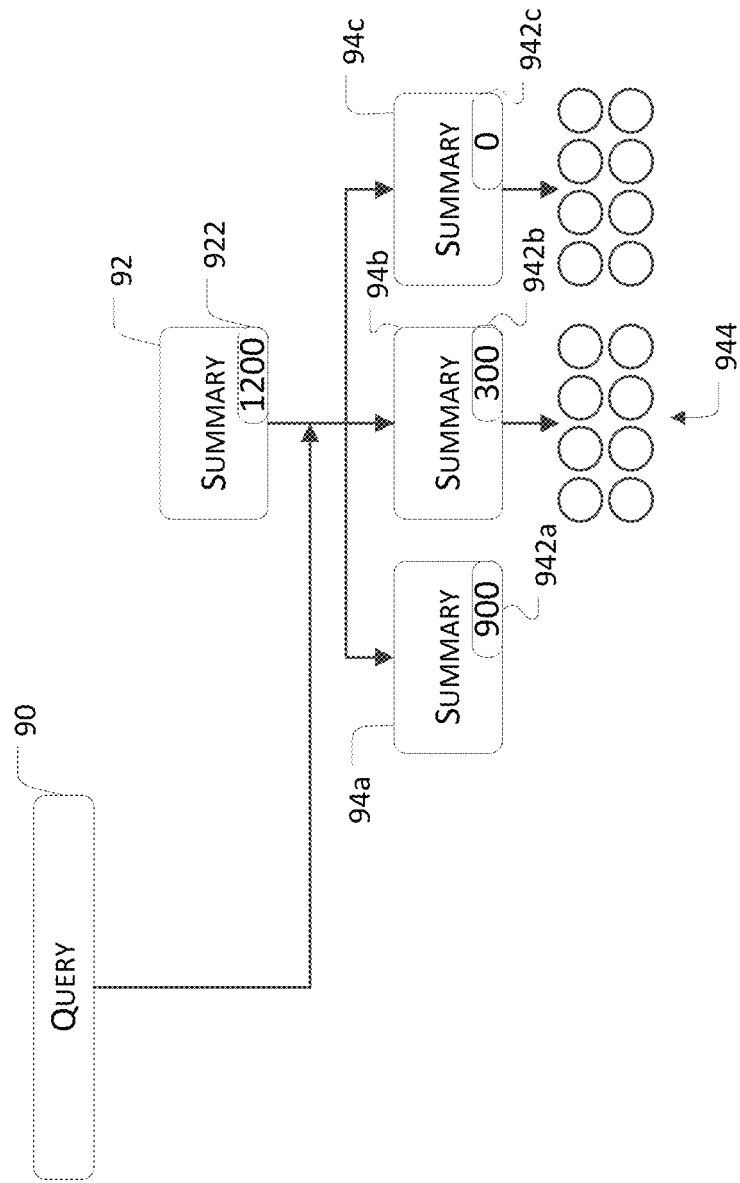
FIG. 11 is a schematic diagram illustrating how a query may be processed at the next lower-level summaries of the summary shown in FIG. 10.

After conducting the query 90 on the summary 92, next resolution (i.e. level) of summaries 94a, 94b and 94c are obtained as shown in FIG. 11. The summaries 94a, 94b and 94c were previously aggregated to obtain the summary 92. The query 90 is conducted on the next resolution of summaries 94a, 94b and 94c. The preliminary results 942a, 942b and 942c are obtained by generating the query on the summaries 94a, 94b and 94c.

The result 942c indicates that there are no features that match the criteria provided in the query 90. In other words, it is not necessary to review the data group from which the summary 94c is generated as the elements in the data group do not match the criteria provided in the query 90.

The result 942b, in contrast, indicates that there are 300 results that match the criteria provided in the query 90. As the summary 94b is a first level summary (i.e. it is not an aggregation of lower level summaries), the features 944 that match the criteria of the query 90 may be downloaded. This downloading may occur in parallel with execution of the queries in other summaries.

Figure 12:
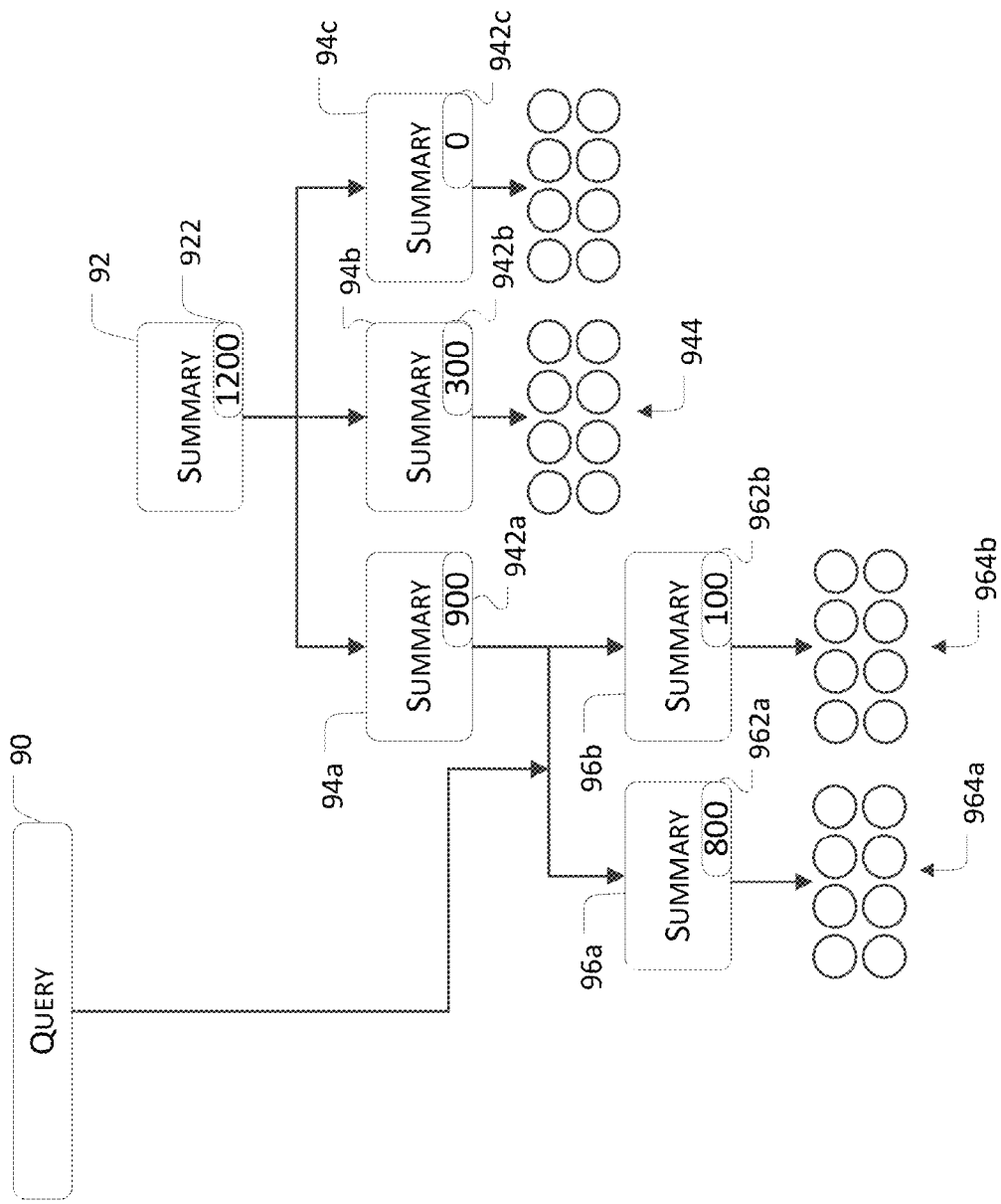
FIG. 12 is a schematic diagram illustrating how a query may be processed at the next lower-level summaries of one of the summaries shown in FIG. 11.
Figure 13:
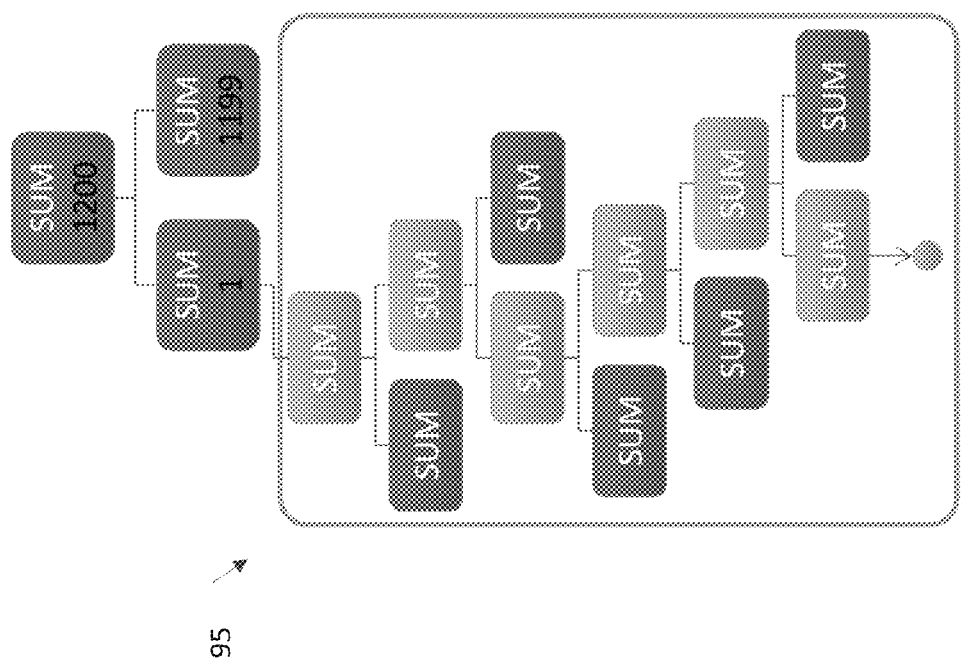
FIG. 13 is a schematic diagram illustrating how a query may be processed by the server shown in FIG. 1 in some embodiments.

The result 942a indicates that there are 900 houses that match the criteria provided in the query 90. However, as the summary 94a is not a first level summary, summaries 96a and 96b in the next level that are related to the summary 94a are obtained as shown in FIG. 12.

The query 90 is executed on the summaries 96a and 96b to obtain the results 962a and 962b. As the summaries 96a and 96b are first level summaries, the features 964a and 964b that match the query 90 may be downloaded if desired.

In some embodiments, queries such as the query 90 may be performed on a client electronic device or a server electronic device as the summaries may be transmitted over the network due to their relatively small sizes.

A processor (e.g. on the client electronic device or a server electronic device) may be configured to receive a query. Upon receipt of the query, relevant summaries for the query may be determined. For example, if the query requires information from two different big data databases, then the overall summaries of those databases may be downloaded. The relevant summary is then obtained.

The processor may then provide relevant summary to another processor or execute the query on the summary itself depending on how the system is configured. For example, if the result on the overall summary indicates that less than 1% of the total number of features match the query, then it might be more efficient to conduct the "quick" query on the server-side, as indicated by reference numeral 95 in FIG. 13, to avoid needing to transmit a plurality of lower level summaries to locate those features.

In other cases, the relevant summaries may be provided to device that submitted the query such that the query may be executed at that device.

There are a number of differences between the big data that is managed using summaries as described above and traditional databases. In a traditional database, the application programming interface "API" is generally SQL like. That is, the client sends a query, the query is executed on the server, and the server send results back to the client. In many cases, if there are more than a specified number of results (e.g. more than 100 results) only the first 100 results are sent back. Additional results may be obtained upon further request. In this type of query processing system, complex queries may require a large amount of processing resources. Furthermore, the server must have access to all of the data.

In contrast, the API for the above described data management system involves downloading an appropriate summary. The queries may then performed on the summary by the client. As such, the processing can be said to be distributed as the processing occurs on the client side, rather than at a server (or a server farm). The client will then down load additional summaries if needed to refine the results. As such, for complex queries, a preliminary results and the margin of error associated therewith can be obtained without requiring a large amount of processing resources. The preliminary result may be "refined" by obtaining additional summaries and continuing to execute the query on those summaries. Furthermore, the data (e.g. the big data) need not be located at the same location as the server. That is, the data could be located at a location that is different from the location of the summaries.

Figure 14:
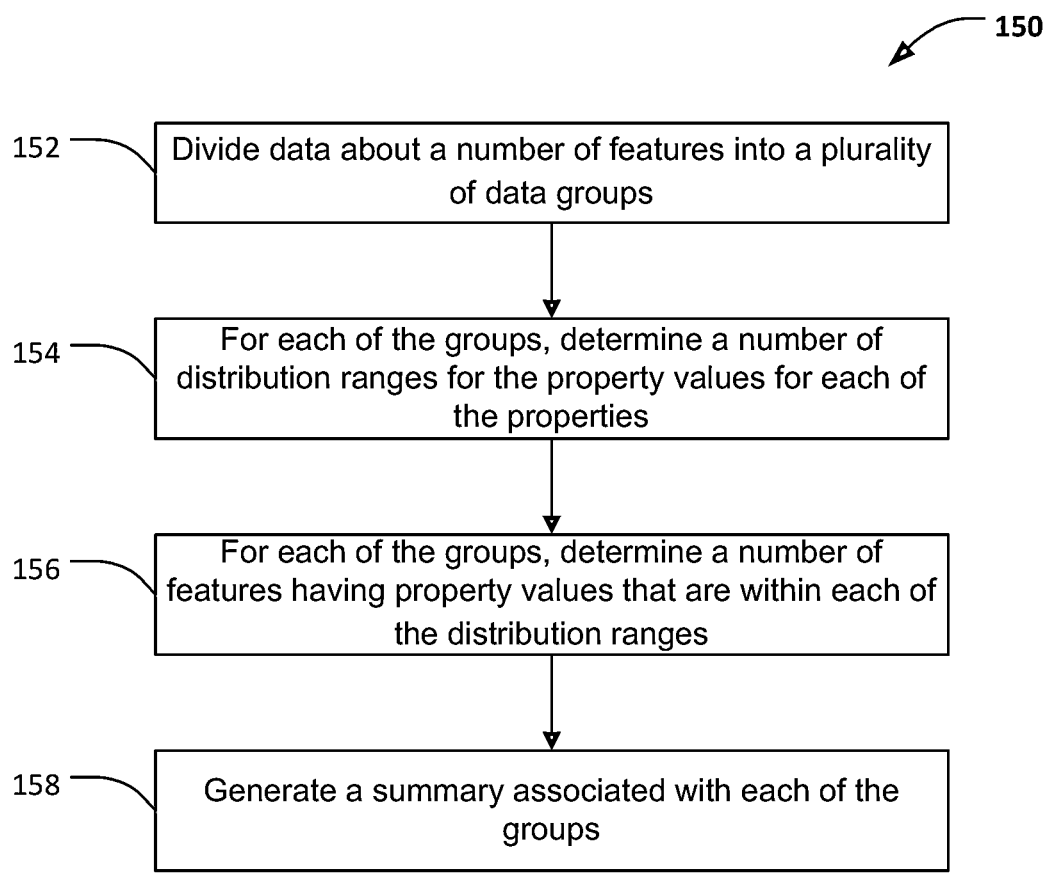
FIG. 14 is a method for managing large volumes of data according to some embodiments.

Referring now to FIG. 14, illustrated therein is a method 150 for managing large volumes of data according to some embodiments.

At step 152, data about a number of features is divided into a plurality of data groups. Each of the groups has a plurality of features, each of the features has a plurality of properties, and each of the properties has a property value.

At step 154, a number of distribution ranges for the property values for each of the properties is determined for each of the groups.

At step 156, a number of features having property values that are within each of the distribution ranges is determined for each of the groups.

At step 158, a summary associated with each of the groups is generated. The summary includes the properties of the features in the group and the number of the features that are within each of the distribution ranges for the properties.

Figure 15:
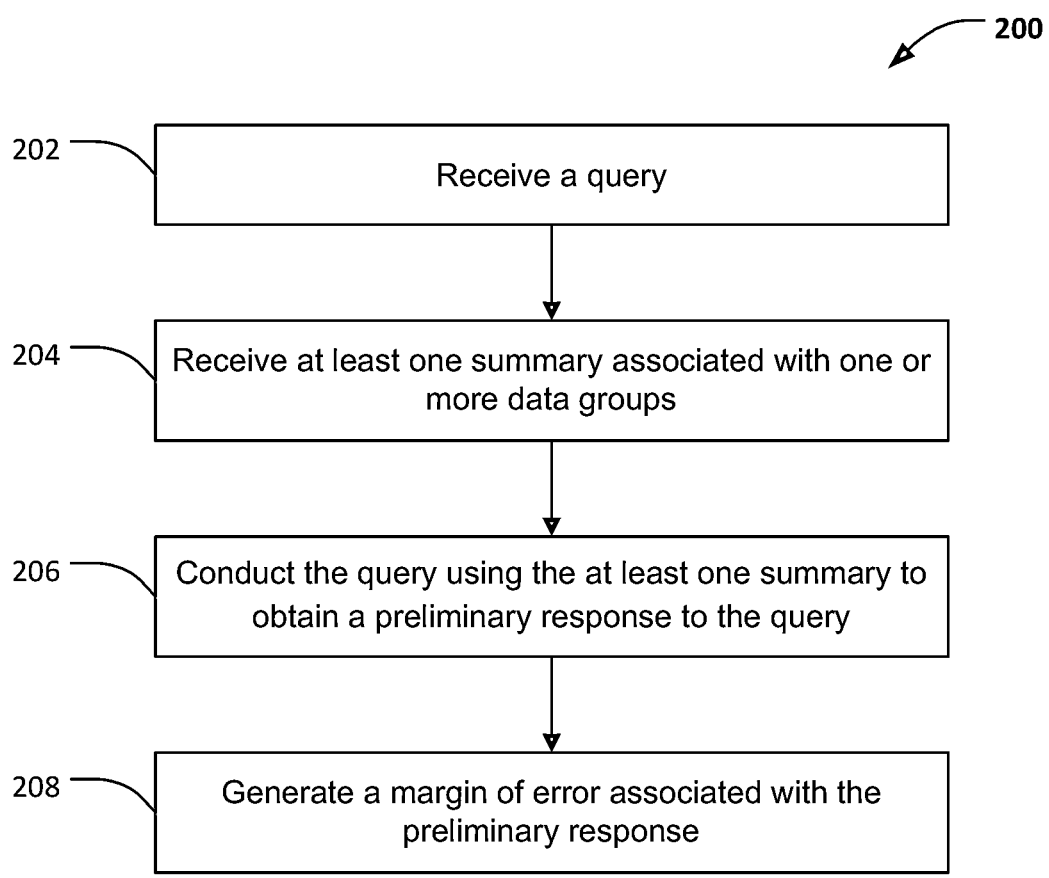
FIG. 15 is a method for processing one or more queries according to some embodiments.

Referring now to FIG. 15, illustrated therein is a method 200 for processing queries according to some embodiments.

At step 202, a query is received.

At step 204, at least one summary associated with one or more data groups is received. Each of the groups has a plurality of features, each of the features has a plurality of properties, and each of the properties has a property value. The at least one summary includes the properties of the features in the group and the number of the features that are within each of the distribution ranges for the properties.

At step 206, the query is conducted using the at least one summary to obtain a preliminary response to the query.

At step 208, a margin of error associated with the preliminary response is generated based upon the margin of error associated with the at least one summary.

The above noted system and methods have been described as being applicable to big data or very large volumes of data. It should be understood that these methods may also be used in connection with managing volumes of data that may not be considered as big data.

Figure 16:
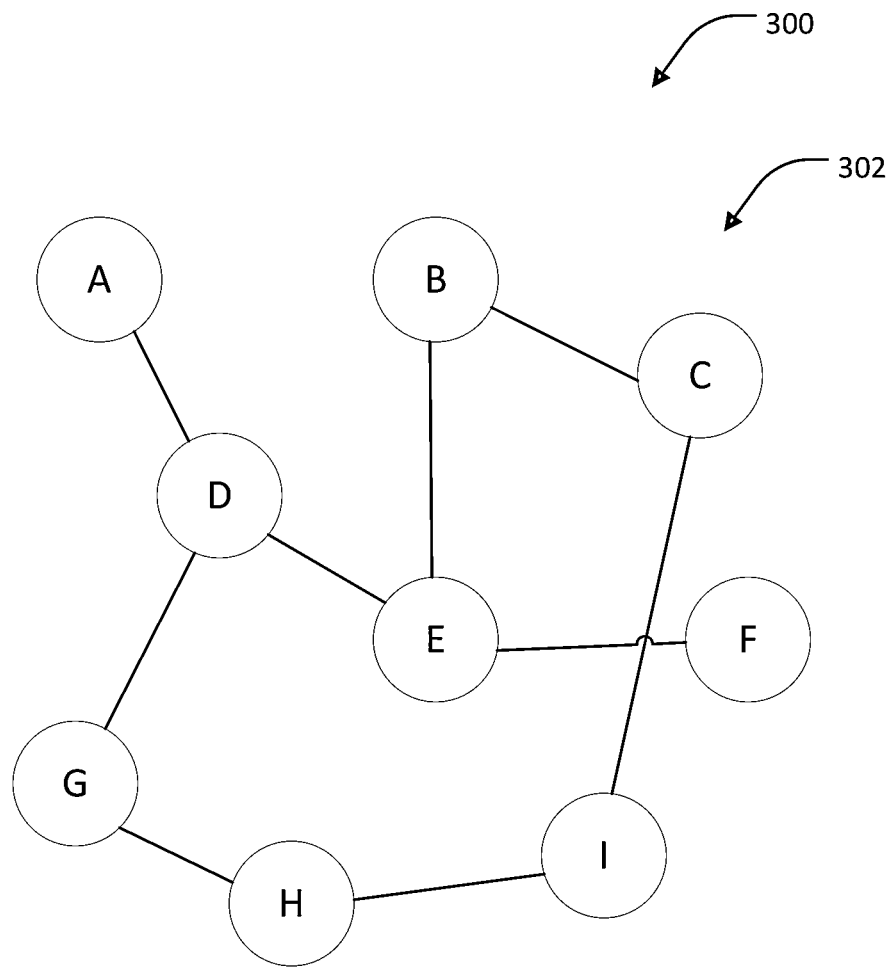
FIG. 16 is a schematic diagram illustrating a distributed system for managing large volumes of data according to some other embodiments.

Referring now to FIG. 16, illustrated there in is a system 300 for processing big data according to some embodiments. The system 300 includes a plurality of processors that functions as nodes 302 of a distributed network. In the example as shown, there are nine nodes—namely node A to node I. Each of the nodes 302 may not be directly connected to other nodes. However, the nodes are in data communication with other nodes through intermediate nodes.

The distributed nature of the nodes and redundancy of communication paths may allow new nodes to join the system or existing nodes to disconnect from the system without effecting the operation of the system.

To facilitate distributed processing, each dataset (for e.g. a big-data database as described herein above,) could be assigned a global identifier (i.e. a dataset identifier) that can be used to identify the dataset. For example, a data set may include information about schools in United States of America. Each node may have access to the entire dataset, have a subset of the dataset, or have information about the dataset (for example summaries as described hereinabove). For example, one of the nodes may have summaries of the dataset about number of schools in Massachusetts and other nodes about schools in other states. Some nodes have information about schools in certain cities and so on.

When a query about the dataset is received at a node, the query along with the dataset identifier for the dataset(s) need by the query can be communicated to other nodes (for e.g. through pee-to-peer ("P2P") protocol). Each of the nodes that has information about the datasets required by the query, as determined based upon the dataset identifier, may choose to assist in executing the query. If a node choses to help, the node may either elect to offer the information about the dataset that it has access to or to conduct the query on the information about the dataset that it has access to.

This can be contrasted from centralized solutions for executing queries where there is a centralized entity that is responsible for conducting the queries. For example, a system may allow clients to run map-reduce queries on a cluster (e.g. Apache™ Hadoop®) The cluster would manage the execution of the query and would send the result when the query is completed. That simplifies execution of the query for the client at the expense of the cluster who assumes responsibility for execution of the query. In contrast, each client 302 in the system 300 is responsible for executing and completing its own queries. This may allow large scale (e.g. internet-scale) distributed analysis network that can enable clients on the web to perform complex queries.

The level of participation for each node within the system 300 may vary depending limitations specific to each node. For example, there may be limitations on processor resources available, data storage, or bandwidth.

Furthermore, as the client, not the centralized system, is responsible for conducting the queries, the client has access to the progress or the current status of the queries. This may allow the client to modify queries even as the queries are being executed. For example, if the query is being executed and the user is viewing a particular area in a map, it may be possible to modify the priorities of the execution in real-time based upon which area the user is viewing. This is particularly helpful if the dataset is divided into groups based upon location, for example in association with tiles indexed using Pyxis indexing.

For example, a client may start a query that looks for all houses that are above a certain square feet in all of Canada. As the query progresses, the system 300 could display current (i.e. intermediate) results for the query as the query is being executed. At that point, based upon the current results, the client may choose to focus on city of Calgary in the province of Alberta. At that point, the client could suspend the execution of the queries for the rest of Canada and focus on the execution of the query on datasets associated with Alberta.

In another example, a client node may decide that it would more efficient to ask a server to perform the query on a sub-group then to download the needed data. In such a case, the client node might send a request for several candidate server over the network to perform the query locally.

Generally, it may not be possible for centralized systems to change or modify execution strategy dynamically where there is centralized administrative unit managing of queries that are being executed. As the administrative unit is managing the execution, the unit can only perform limited number of queries on the cluster before it is overrun. Similar limitations may apply to other data-centre oriented solution. They can perform limited number of queries at the same time that require going over the data. Alternatively, they can pre-calculate result for a specific query (or set of queries) and index all the result so they could answer many users quickly (e.g. Google™ search).

By using P2P protocols and adding a checksum for each summary, the nodes can publish and distribute summaries that were downloaded earlier. One benefit from using P2P is that the network can automatically scale to meet demand of the users queries. If there are more users, the same the dataset may be distributed at faster speeds across the network.

One problem with the OLAP cubes and multi-dimensional histograms is the increasing margin of error as the number of properties considered is increased. Alternatively, to reduce the margin of error, the size of the cubes can be increased. However, increasing the size of the cubes generally degrades performance. For example, OLAP cube are generally limited to 7 dimensions because of the increasing margin of error. In contrast, the above described means of grouping based upon spatial data using Pyxis-indexing could be used to generate multi-dimensional histograms on the fly based upon spatial information.

For example, an exemplary query requesting the number of dwelling that are above 500 square feet in area and remit less than $800 in taxes. This query could be rewritten as how many dwellings are in the intersection of the area of all "500 square feet" dwellings with the area of all "$800 taxes" dwellings. For large enough data sets (millions of features), it may be more efficient to calculate the intersection of the areas then transmitting the information on all the houses. The areas could be described using Pyxis-indexing.

Figure 18A:
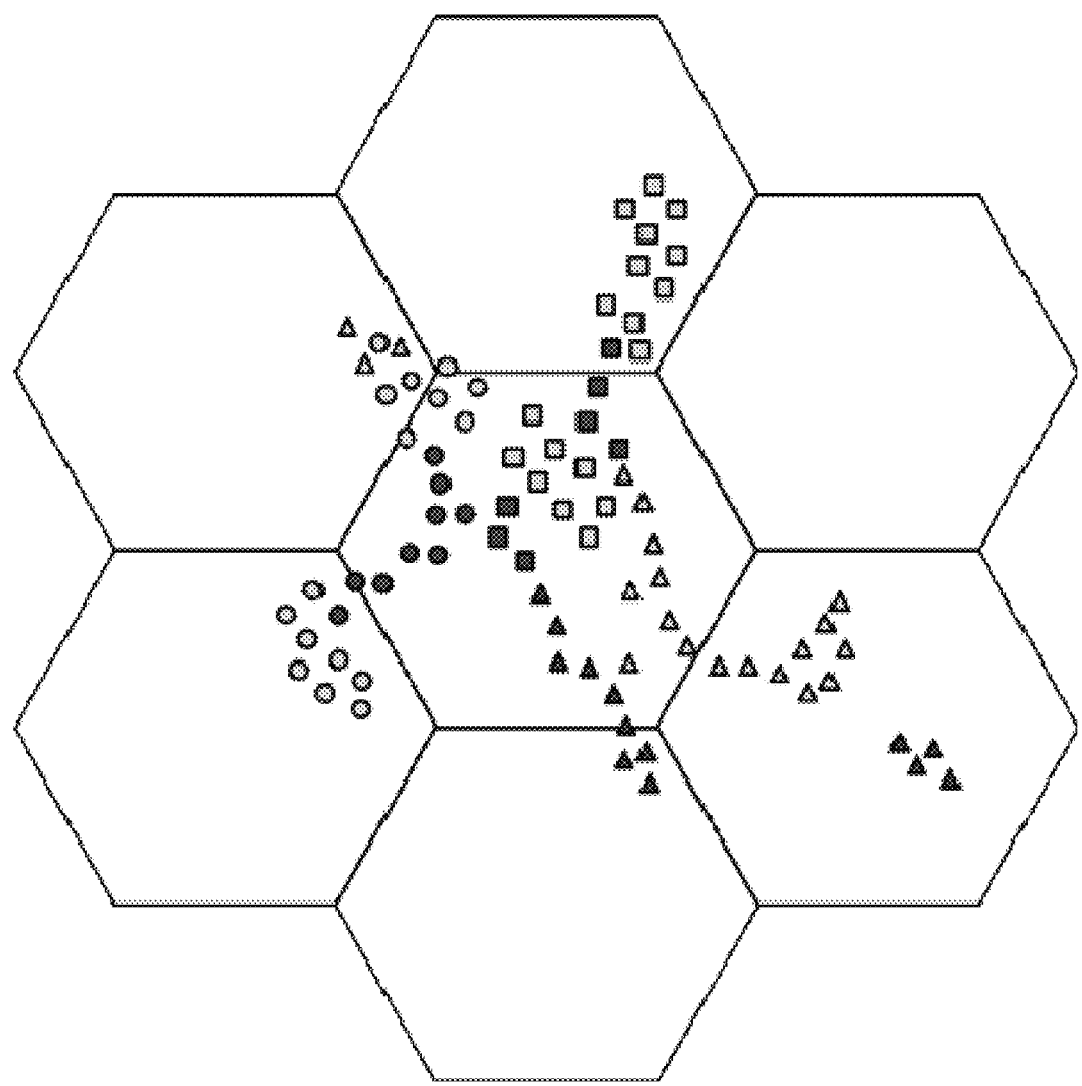
FIGS. 18A-18D are schematic diagrams illustrating how two summaries provided by the systems shown in FIGS. 1 and/or 16 for two different properties could be combined to respond to a query.

Referring now to FIG. 18A, illustrated therein are a number of features. Assuming that square features are above 500 square feet and light grey shading is reflective of less than $800 in taxes. In such a case, the query is for light-grey coloured squares.

Figure 18B:
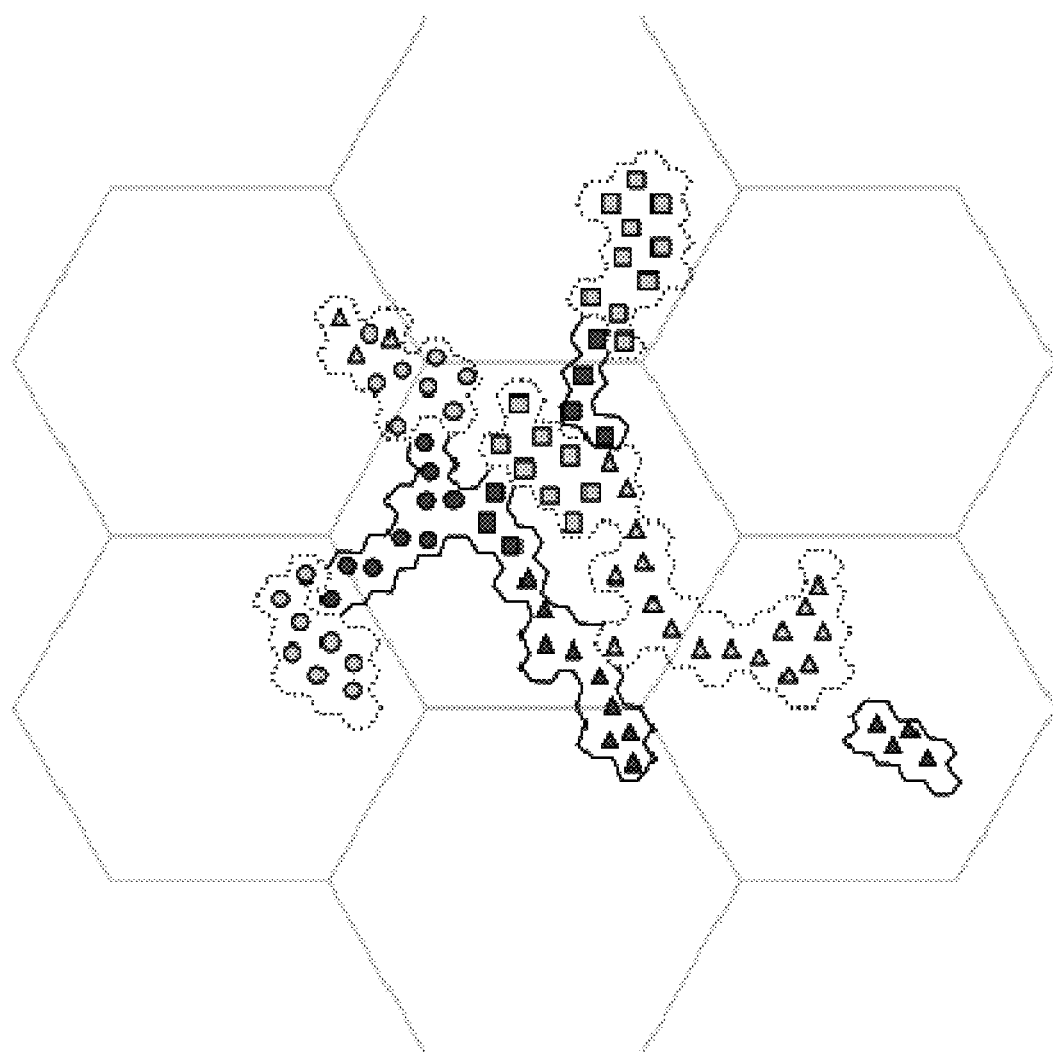
Figure 18C:
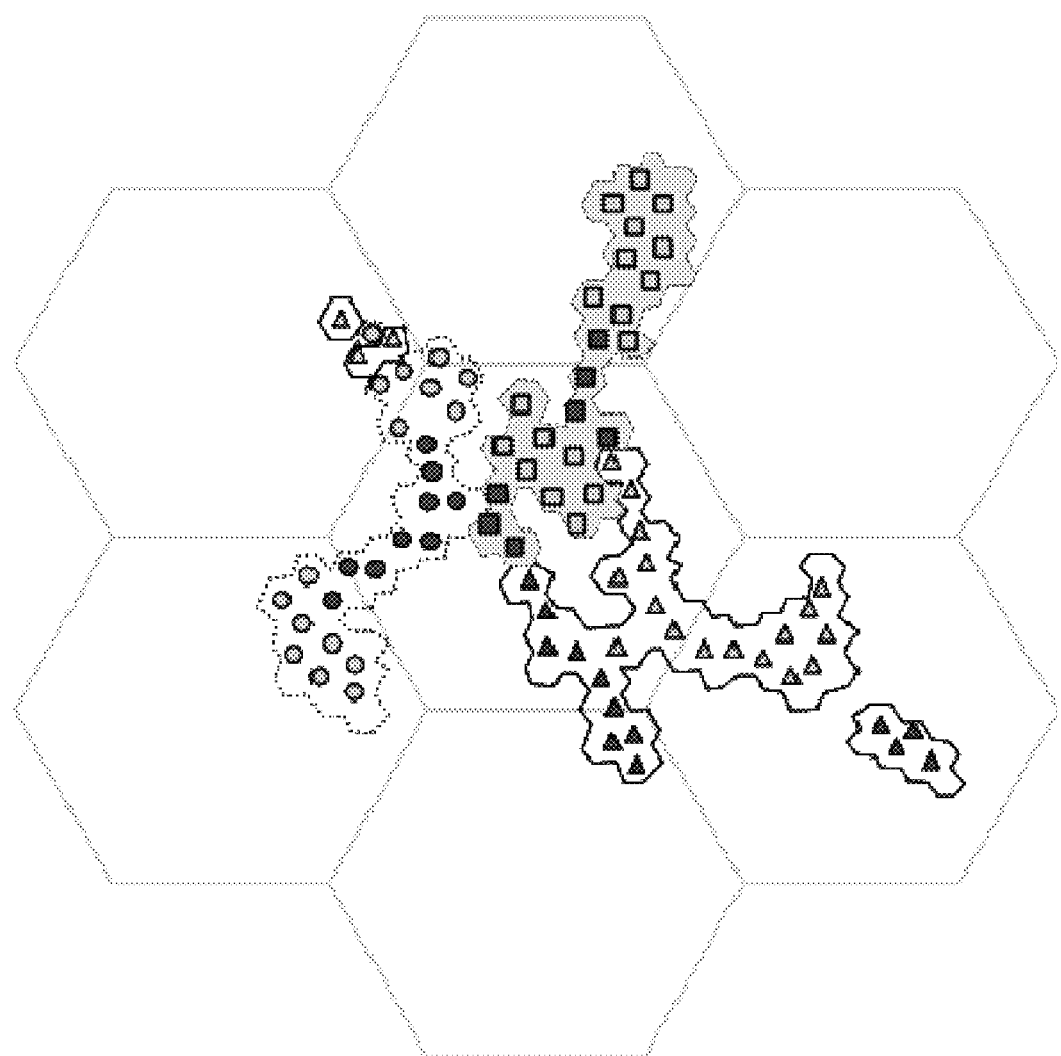
Figure 18D:
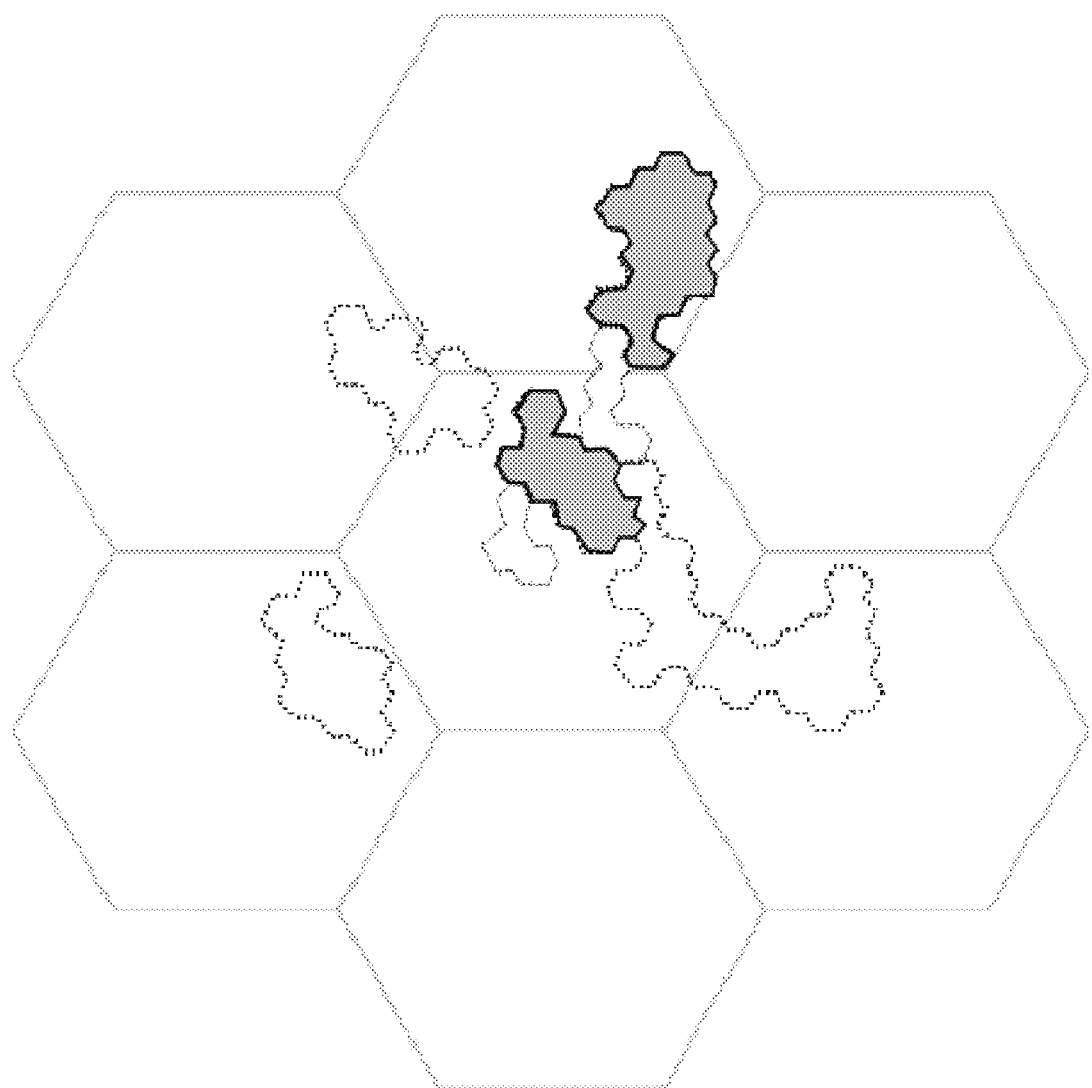

In the first step, the regions are calculated based upon taxes as shown in FIG. 18B. Secondly, areas are calculated based upon square feet (i.e. identify the squares). Each property is converted into a collection of areas as shown in FIG. 18D. Pyxis-indexing allows storage of very complex regions in a very compact presentation, which may allow more efficient transmission thereof.

Moreover, the summaries may be combined with summaries that count features per cell (this information was generated when groups were created based upon Pyxis-Index) to get a good estimation on how many dwellings match the query. Furthermore, the data could be used to provide fast visualization for the user where (on earth) the query matches.

The above example is provides a good illustration of how two summaries for different properties could be used to respond to a single query. The client can use the binary single dimension histogram to give an initial estimation on the results. As the client continues to perform the query, it can choose to switch to use the on the fly multi-dimensional histogram based on Pyxis-regions to speed up the query. Note that in this example, if one of the single-dimension histogram returns 0 features, there is no need to continue to process the groups. In other words, it is possible to perform spatial joins between different datasets and/or different property constraints. For example, it is possible to join a dataset including information about dwellings to another dataset including information about schools based upon location (e.g. using Pyxis index).

In some cases, if there are two nodes that are trying to perform similar queries the nodes may coordinate between themselves to execute the queries, thereby combining their efforts. For example, a first node may download some dataset subsets while other may download other dataset subsets for the, where each node download summaries for different groups.

Figure 17A:
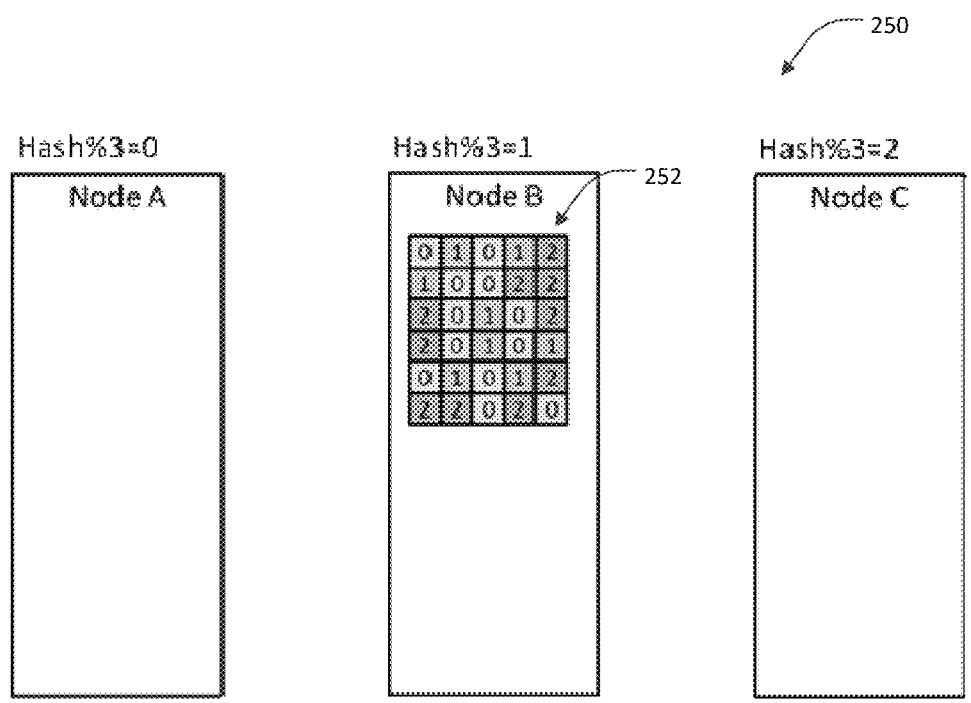
FIGS. 17A-17E are schematic diagrams illustrating how the nodes shown in the system of FIG. 16 may cooperate to generate the summaries.

Referring now to FIG. 17A, illustrated therein are a number of nodes 250. In the example, node B is desirous of generating the summaries of the dataset 252 that it has access to and Node A and Node C is willing to help in with the process. Each group is associated with a spatial tile (i.e. a location) and could be referred to using the index associated with the tile. For example, each group may be associated with a hexagonal cell with a Pyxis index.

Figure 17B:
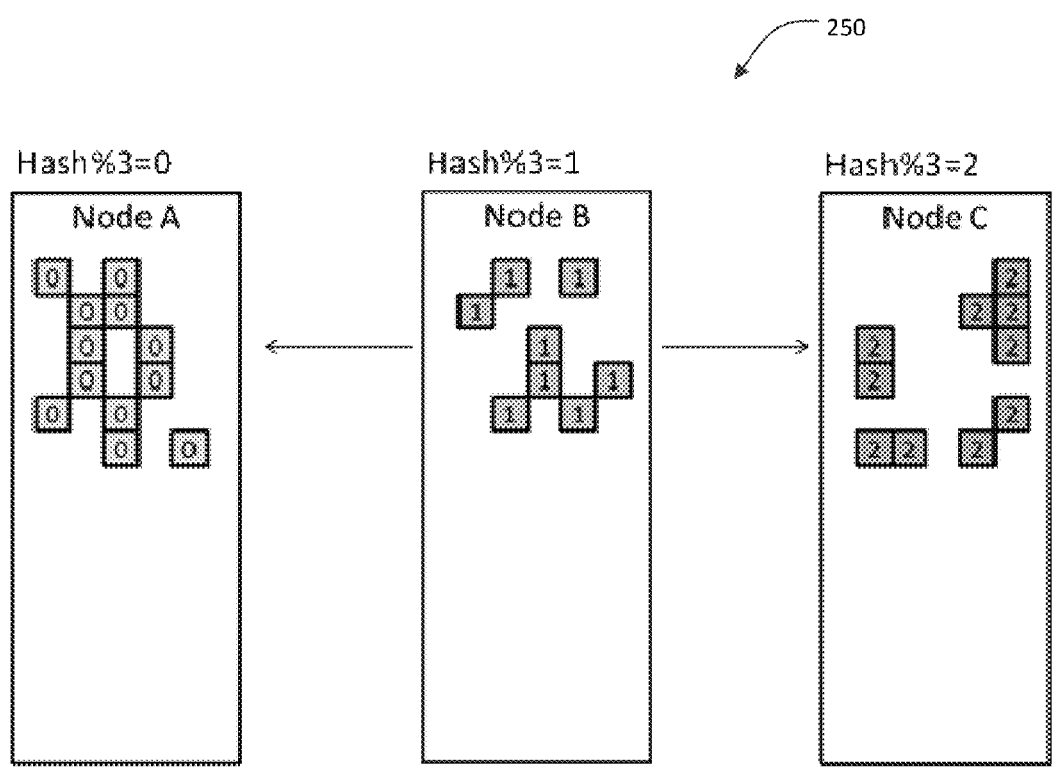
Figure 17C:
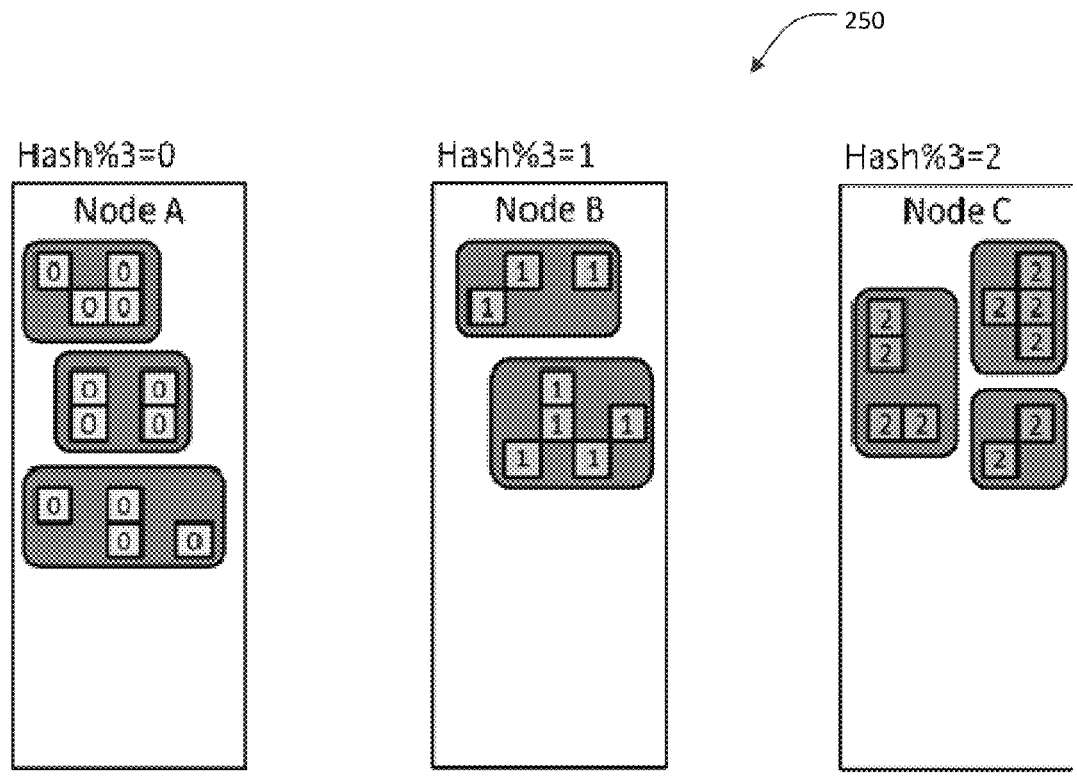
Figure 17D:
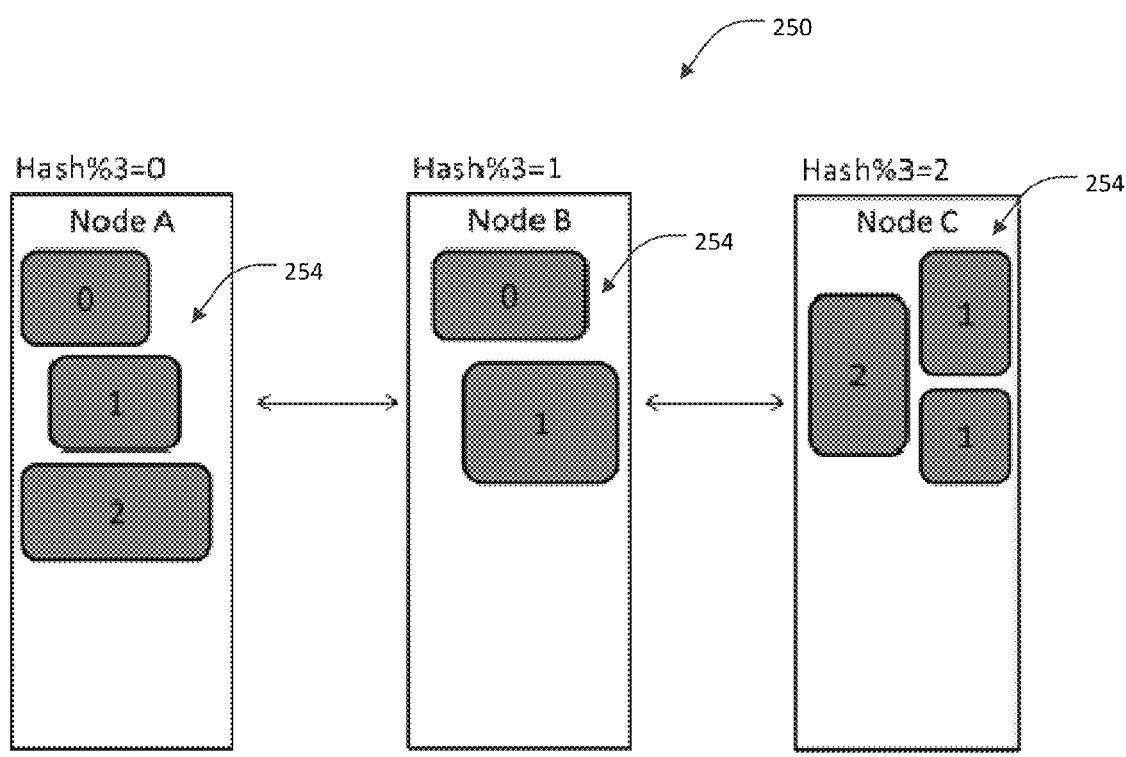
Figure 17E:
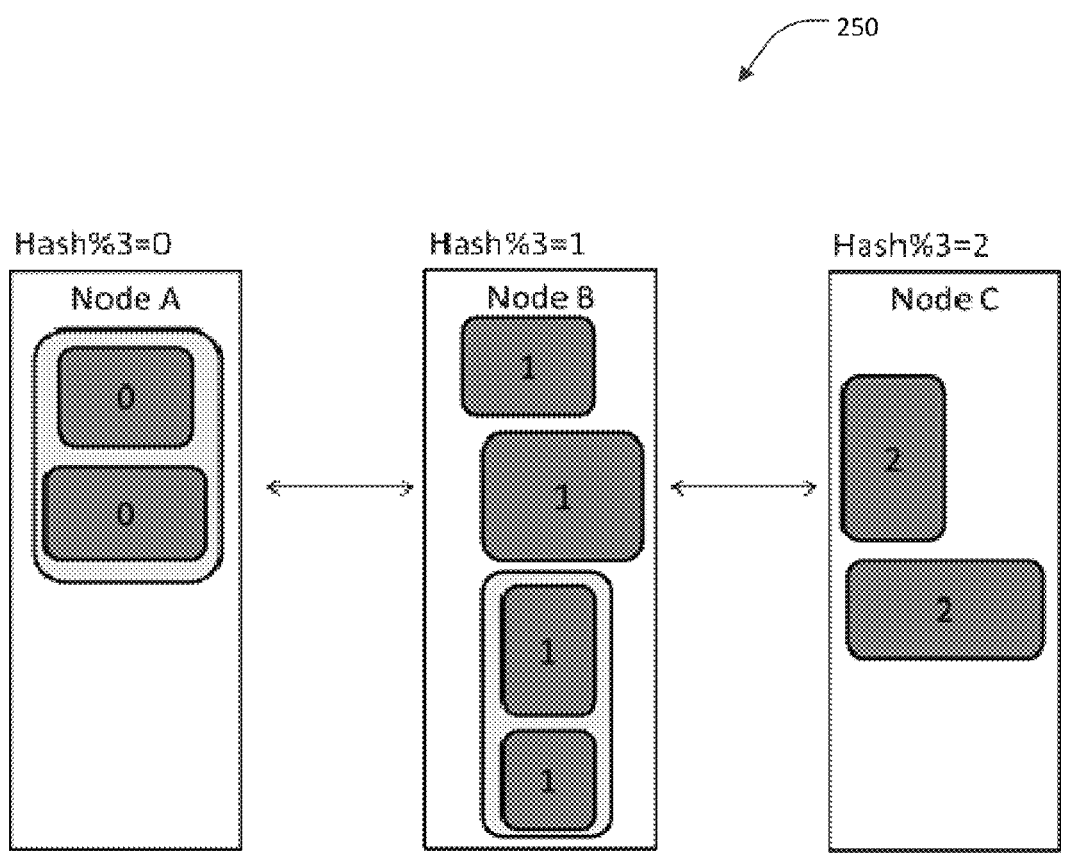

To distribute the data between the nodes, node B may apply a hash code to determine which data to distribute to which node. Based upon the results of the hash, some of the data is provided to node A and some to node C as shown in FIG. 17B. Each of the nodes then generates summaries 254 for the features that are provided as shown in FIG. 17C. At this point, a hash value for each summary is obtained as shown in FIG. 17D. The summaries are then redistributed to corresponding nodes as shown in FIG. 17E. Each of the nodes will then merge the summaries 254 it has to obtain one or more combined summaries that include the summaries 254

Using Pyxis-Tiles may create a good balance between distributing the data across machines while maintaining features' locality. That is, features that are geographically close to each other are generally stored on the same node. This may allow improved streaming of features. For example, all dwellings in north Calgary would be stored on node A, while all dwellings at south Calgary would be stored on node B.

Figure 19:
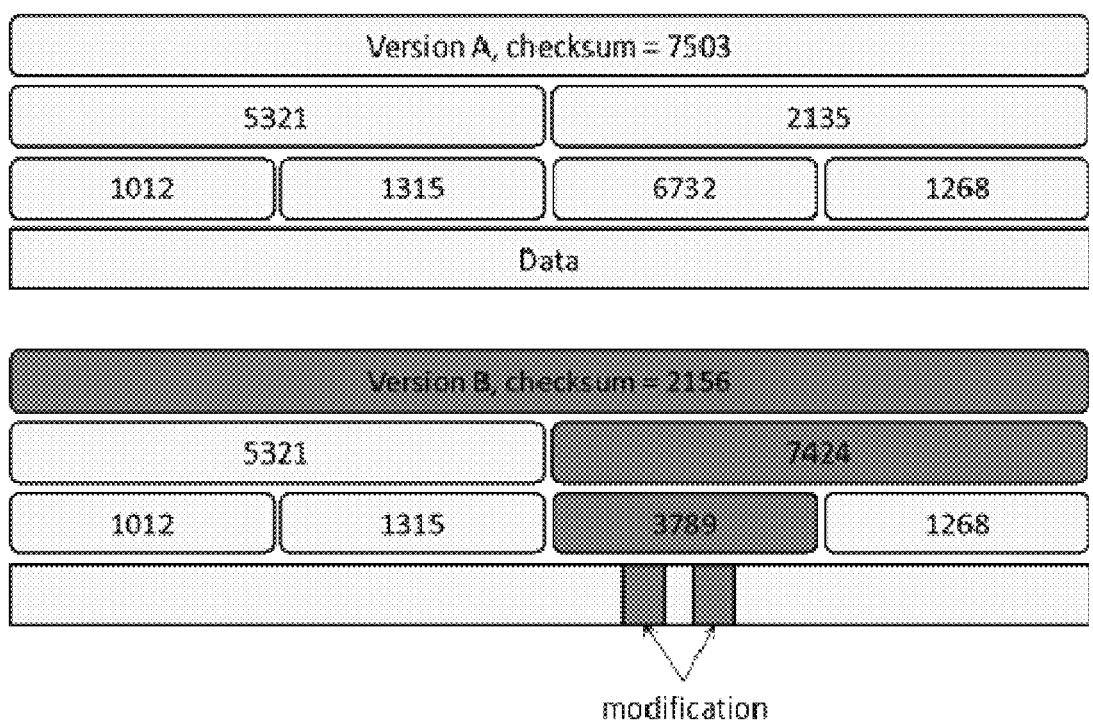
FIG. 19 is a schematic diagram illustrating how updates to the datasets provided by the systems shown in FIGS. 1 and/or 16 may be managed.

Referring now to FIG. 19, illustrated therein is way for addressing dataset modifications. That is, datasets and summaries of the datasets may be updated from time to time. For example, in the dwellings dataset new dwellings can be added over time or dwellings properties could change (owner, number of people, taxes). If a single element has change in the dataset of millions of features, there is no need to download the entire dataset or rerun the queries.

The group hierarchy permits nodes to detect modification and to decide the groups that need to be recalculated. For example, each group could generate a checksum (e.g. a four figure number) using a checksum algorithm such as MD5, SHA256 or other suitable algorithms. The checksum may be calculated from the checksum of the features contained by the group. Therefore, if a single feature change, all the groups containing that feature would have a new checksum. Therefore, a node can choose which version to use when running a query. The checksum is used to request the right group summary that matches the version of the data the client requested. And interesting example is that Node A run a query on version A, and Node B contain version B of the data. However Node A can still request summaries 1012, 1315, 1268 and 5321 from Node B. Moreover, if Node B knows the delta between Version A and Version B, Node B can regenerate summaries 6732, 2135 and 7503 by applying the reverse modification on the change from version A to version B.

Using the SHA256 algorithm to generate checksum may require that the data be ordered. However, this may not be desirable when generating several summaries and groups hierarchies. As an alternative to the SHA256 algorithm, a "commutative checksum" may be used. The attributes of "commutative checksum" is that the checksum calculate on set of items (X1, X2, ... , Xn) would be same checksum calculated on every different ordering of (X1, X2, ... , Xn). This permits switching between group hierarchies if their checksum is the same. Moreover, since the groups have a Pyxis-region associated therewith, the update process could be sped up by obtaining an intersection of modified area over different group hierarchies.

One exemplary way of conducing a commutative checksum is as follows. Given a list of features F={f1, ... , fn}, using checksum function like SHA256 to calculate a checksum for each feature, marked as C(f1). C(f1) will return a list of bytes. C(f1)·length return the length of the checksum, and C(f1)[i] represent the byte #i in the checksum. A checksum transformation, T(checksum), as follows:

```
function T(checksum)
Result: byte[256];
For(i=0;i<checksum.length-1;i++)
{
    int carry = 0;
    int j = 1;
    do
    {
        int sum = Result[checksum[j]] + chechsum[j+1] + carry;
        Result[checksum[i]] = sum % 256;
        carry = sum / 256;
        j = (j+1)%256;
    } while (carry > 0);
}
return Result;
```

It is possible to take each checksum C(fk) and convert it into a list of 256 bytes using T(C(fk)).
The commutative operator on the checksum transform is defined as follows.

```
Function op(CtA,CtB)
Result: byte[256];
int carry = 0;
For(i=0;i<256;++i)
{
    int sum = CtA[i]+CtB[i] + carry;
    Result[i] = sum % 256;
    carry = sum / 256;
}
int i = 0;
While (carry>0) {
    int sum = Result[i] + carry;
    Result[i] = sum % 256;
    carry = sum / 256;
    i++;
}
return Result;
```

It should be understood that the op is simply a cyclic number addition when we keep adding the carry in a cyclic manner. It is possible to prove that op(T(C(f1), T(C(f2))=op(T(C(f2)), T(C(f1)). Moreover, we can define T({f1, . . . , fn}) as:

```
Function T(list<F> fs)
Result: byte[256];
foreach(f in fs)
{
    Reuslt = op(Result,T(C(f));
}
return Result;
```

Therefore, it is possible to prove that T({f1, . . . , fn})=op (T({f1, . . . , fk}), T({fk+1, . . . , fn})). In other words, the commutative checksum of a group of features is equal to the addition of commutative checksums of each feature or the commutative of distinct subgroups of those features.

Figure 20:
FIG. 20 is a schematic diagram illustrating how commutative checksum may be used to switch between different group hierarchies of the groups provided by the systems shown in FIGS. 1 and/or 16.

The commutative checksum may now be used to switch between different group hierarchies, for example, as shown in FIG. 20. In the example shown in FIG. 20, there are a set of features to be spilt into group and sub groups. If a normal checksum is used, then the checksum of Group1 will not be the same for the checksum of A1, B1, C1 and D1 groups.

However, the commutative checksum of Group1 is equal to commutative checksum of all commutative checksum of A1, B1, C1 and D1 groups. Moreover, the commutative checksum of Group 1, Group 2, Group 3 and Group 4 is equal to the commutative checksum of Group A, Group B, Group C and Group D which is also equal to calculate the commutative checksum on all the features.

Furthermore, If addition operator is defined, it is possible to define the inverse subtract operator. This two add/sub operations can be used to speed up commutative checksum modification when part of the features as change. For example, assume that feature f1 changed into f1' and f2 was deleted and f3 was added. So, the new-checksum=old-checksum add {f3,f1'} sub {f1,f2}. The checksum can be updated without the need to recalculate the complete checksum from all subgroups checksums. This is a major speed up in comparing and calculating on checksum on a collection of items.

Figure 21:
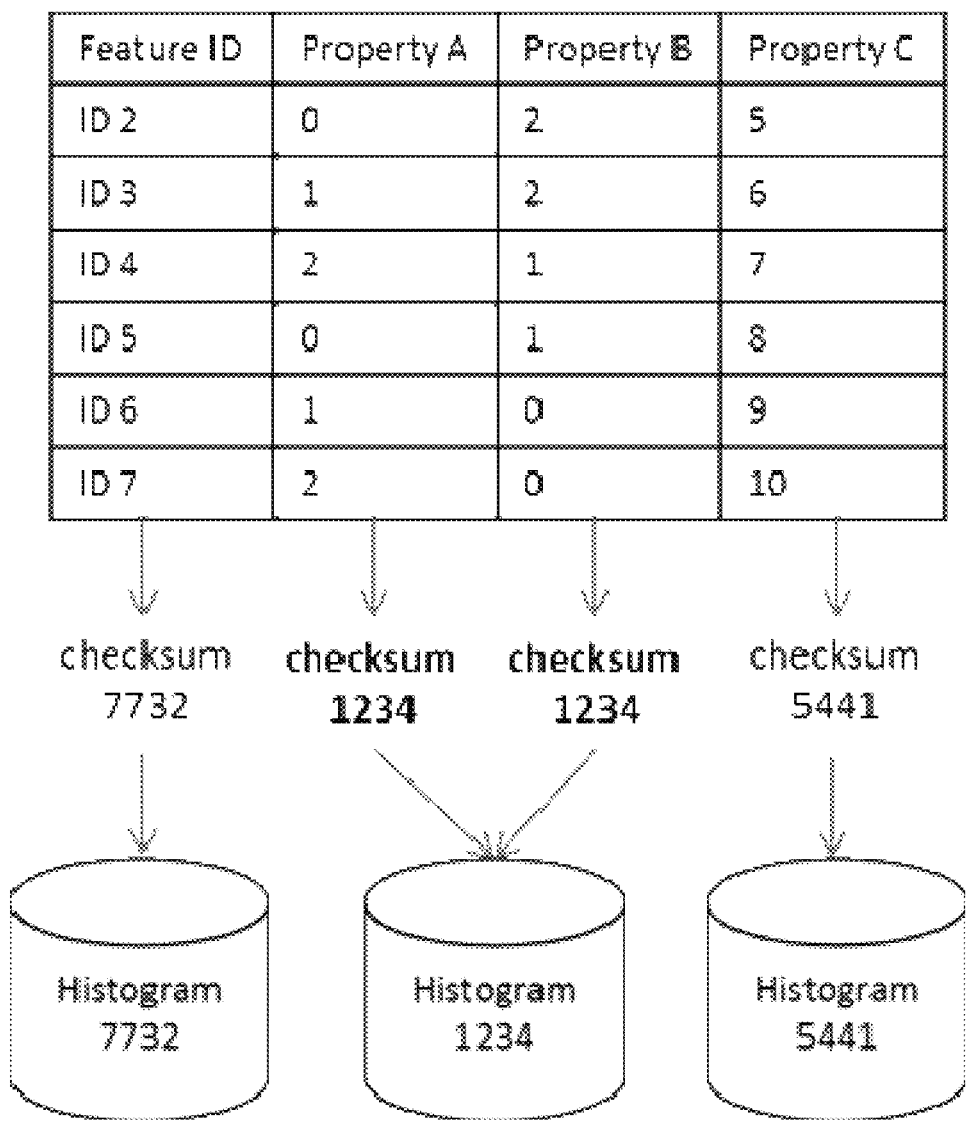
FIG. 21 is a schematic diagram illustrating how commutative checksum of FIG. 20 may be used to optimize the space needed for storing multiple version of same dataset or store different dataset that share the same properties or features.

Another use for commutative checksum is to optimize the space needed for storing multiple version of same dataset, or store different dataset that share the same properties or features. Referring now to FIG. 21, illustrated therein is a collection of 6 features with 3 properties per feature. Although Property A and Property B has different meaning and order, the distribution of both properties are the same: two features have value '0', two have value '1' and two have value '2'. Therefore, the commutative checksum on both values of Property A and Property B will be equal. As the result, it is possibly to calculate the histogram on for Property A, and store it only once into the disk. That histogram can then be used for Property B as well.

Moreover, calculating the commutative checksum for each property allows reduction of the amount of calculation needed when the modification was on a single property that does not affect the rest of the properties. Moreover, this can be used to reduce the amount of storage need when adding a new property to a dataset.

Figure 22:
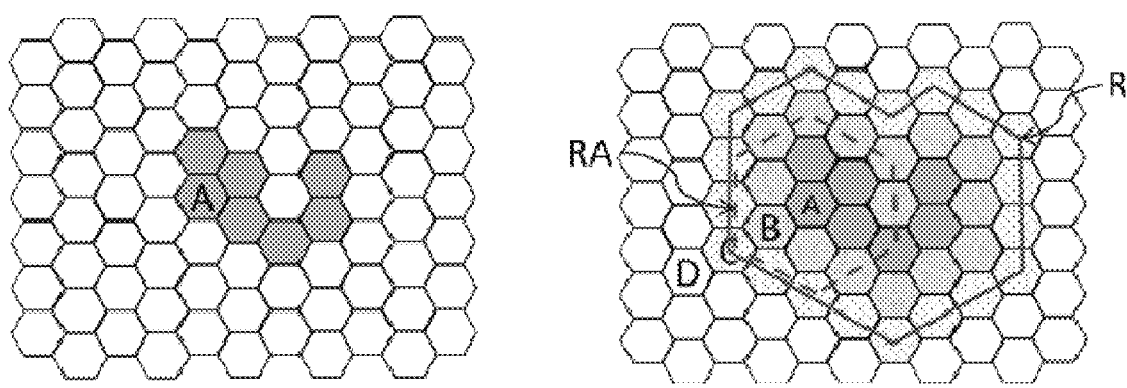
FIG. 22 is a schematic diagram illustrating how an exemplary buffer operation based upon Pyxis tile could be conducted by the systems of FIGS. 1 and/or 16.

Referring now to FIG. 22, illustrated therein is an exemplary buffer operation based upon Pyxis tile indexing. Using Pyxis tile indexing may allow estimation on spatial joins and buffer operations. For example, consider the following buffer operation. The exemplary query in this case is to locate a house with three or more coffee shops (i.e. three or more counts of a feature) within 100 meters. Assuming that the grey areas represent areas where there are coffee shops, the buffer operation is conducted as follows. 100 meters is calculated to be the width of cells as indicated by R. The number of coffee shops within each cell can be obtained from the summary of the cell (i.e. count of feathers).

Firstly, it can be assumed that the cells in the grey area (e.g. cell A) are close to at least one coffee shop since the cell itself contains at least one coffee shop. Furthermore, cells that are one cell width removed from the grey areas (e.g. cell B) are close to at least one coffee shop since those cells are contained within range R, and thereby be less than 100 meters from the cells in the grey area that includes at least one coffee shop.

Moreover, by using the number of coffee shops in each cell as obtained from the summary, a more accurate estimation for the number of coffee shops can be obtained as follows. For each cell (e.g. cell A), a minimum number of coffee shops within 100 meters is indicated by the sum of all of the coffee shops in the cells that are within 100 meters from that cell (i.e. the cells that are completely within range RA); and the maximum number of coffee shops is the sum of all of the coffee shops that are within the cells that are partially covered by range RA.

For example, if each of the cells contains exactly 2 coffee shops, the estimation for cell A would be that there are between 8 to 10 coffee shops within 100 meters from cell A.

This is because there are four grey cells completely within the range RA and one cell that is partially within the range RA.

While the above description provides examples of one or more apparatus, systems and methods, it will be appreciated that other apparatus, systems and methods may be within the scope of the present description as interpreted by one of skill in the art.

The invention claimed is:

1. A computer-implemented method for processing queries comprising:
   (a) receiving a query;
   (b) receiving at least one summary associated with one or more data groups, each of the groups having a plurality of features, each of the features having a plurality of properties, each of the properties having a property value, and the at least one summary including the properties of the features in the group and the number of the features that are within each of the distribution ranges for the properties;
   (c) conducting the query using the at least one summary to obtain a preliminary response to the query; and
   (d) generating a margin of error associated with the preliminary response based upon the distribution ranges for the properties in the at least one summary.

2. A computer-implemented method for processing queries, comprising:
   (a) receiving a query;
   (b) receiving at least one summary associated with one or more data groups, each of the groups having a plurality of features, each of the features having a plurality of properties, each of the properties having a property value, and the at least one summary including the properties of the features in the group and the number of the features that are within each of the distribution ranges for the properties;
   (c) conducting the query using the at least one summary to obtain a preliminary response to the query;
   (d) generating a margin of error associated with the preliminary response based upon the distribution ranges for the properties in the at least one summary;
   (e) receiving at least one additional lower-level summary that is of a different level than a previously received summary;
   (f) conducting the query using the at least one lower-level summary to obtain a second preliminary response to the query; and
   (g) generating a margin of error associated with the second preliminary response based upon the margin of error associated with the at least one summary.

3. The method of claim 2, further comprising repeating the steps of claim 2 until a preliminary response within an acceptable margin of error is obtained.

4. The method of claim 2, further comprising determining which lower-level summary to receive based upon the at least one previously summary.

5. An information system comprising:
   (a) at least one server having access to a hierarchical levels of summaries associated with one or more data groups, each of the groups having a plurality of features, each of the features having a plurality of properties, each of the properties having a property value, and the at least one summary including the properties of the features in the group and the number of the features that are within each of the distribution ranges for the properties; and
   (b) at least one electronic device in data communication with the server, the at least one electronic device configured to:
      (i) receive a query,
      (ii) receive at least one summary from the at least one server,
      (iii) conduct the query using the at least one summary to obtain a preliminary response to the query, and
      (iv) generate a margin of error associated with the preliminary response based upon the margin of error associated with the at least one summary.

6. The system of claim 5, wherein the data groups are aligned on a common geospatial grid.

7. The system of claim 6, wherein the summaries can be divided and combined for transmission thereof.

8. The system of claim 5, wherein the at least one electronic device comprises a plurality of devices in data communication with each other via a peer to peer network.

9. An information system comprising:
   (a) at least one server having access to a hierarchical levels of summaries associated with one or more data groups, each of the groups having a plurality of features, each of the features having a plurality of properties, each of the properties having a property value, and the at least one summary including the properties of the features in the group and the number of the features that are within each of the distribution ranges for the properties;
   (b) at least one electronic device in data communication with the server, the at least one electronic device configured to:
      (i) receive a query,
      (ii) receive at least one summary from the at least one server,
      (iii) conducting the query using the at least one summary to obtain a preliminary response to the query, and
      (iv) generating a margin of error associated with the preliminary response based upon the margin of error associated with the at least one summary,
      (v) receiving at least one additional lower-level summary that is of a different level than a previously received summary,
      (vi) conducting the query using the at least one lower-level summary to obtain a second preliminary response to the query, and
      (vii) generating a margin of error associated with the second preliminary response based upon the margin of error associated with the at least one summary.

10. The system of claim 9, wherein the data groups are aligned on a common geospatial grid.

11. The system of claim 10, wherein the summaries can be divided and combined for transmission thereof.

12. The system of claim 9, wherein the at least one electronic device comprises a plurality of devices in data communication with each other via a peer to peer network.

* * * * *